United States Patent
Wood et al.

(10) Patent No.: US 12,012,541 B2
(45) Date of Patent: Jun. 18, 2024

(54) DEFECT MEDIATED LYOTROPIC NEMATIC GEL

(71) Applicant: THE UNIVERSITY COURT OF THE UNIVERSITY OF EDINBURGH, Edinburgh (GB)

(72) Inventors: Tiffany Wood, Edinburgh (GB); Navneeta Katyan, Edinburgh (GB)

(73) Assignee: THE UNIVERSITY COURT OF THE UNIVERSITY OF EDINBURGH, Edinburgh (GB)

( * ) Notice: Subject to any disclaimer, the term of this patent is extended or adjusted under 35 U.S.C. 154(b) by 73 days.

(21) Appl. No.: 17/613,858

(22) PCT Filed: Jun. 18, 2020

(86) PCT No.: PCT/GB2020/051479
§ 371 (c)(1),
(2) Date: Nov. 23, 2021

(87) PCT Pub. No.: WO2020/254813
PCT Pub. Date: Dec. 24, 2020

(65) Prior Publication Data
US 2022/0235270 A1    Jul. 28, 2022

(30) Foreign Application Priority Data
Jun. 19, 2019 (GB) .................................... 1908811

(51) Int. Cl.
G02F 1/1333 (2006.01)
C09K 19/02 (2006.01)
C09K 19/54 (2006.01)

(52) U.S. Cl.
CPC ........ *C09K 19/544* (2013.01); *C09K 19/0208* (2013.01)

(58) Field of Classification Search
CPC ............... C09K 19/542; C09K 19/544; C09K 19/0208; C09K 19/52; C09K 19/526
See application file for complete search history.

(56) References Cited

U.S. PATENT DOCUMENTS

| | | | |
|---|---|---|---|
| 8,278,040 B2* | 10/2012 | Abbott | C09K 19/52 435/7.1 |
| 9,080,973 B2* | 7/2015 | Abbott | G01N 21/77 |
| 2010/0062525 A1 | 3/2010 | Abbott et al. | |
| 2022/0235270 A1* | 7/2022 | Wood | C09K 19/544 |

FOREIGN PATENT DOCUMENTS

WO    WO-2010/126774    11/2010

OTHER PUBLICATIONS

Bukusoglu et al., "Colloid-in-Liquid Crystal Gels Formed via Spinodal Decomposition", Soft Matter, Mar. 14, 2014, vol. 10(10), pp. 1602-1610.
International Search Report and Written Opinion on International Application No. PCT/GB2020/051479 dated Sep. 25, 2020 (12 pages).
Katyan, "Gel formation in nematic liquid crystals", Condensed Matter lunchtime seminar, University of Edinburgh, 2017, https://www.ph.ed.ac.uk/events/2017/76933-gel-formation-in-nematicliquid-crystals.
Search Report on GB Patent Application No. 1908811.1 dated Dec. 23, 2019 (4 pages).
Wood et al., "A self-Quenched Defect Glass in a Colloid-Nematic Liquid Crystal Composite", Science, Oct. 7, 2011, vol. 334, pp. 79-83.
Katyan et al., "Colloidal Charge Effects on Defect-Gel Stability in Lyotropic Nematic Phases", 2018.
Katyan et al., "Effect of Colloidal Charge on Microstructure and Rheology in a Nematic Solution (sds/decanol/water)", European Colloid and Interface Society, 2018.
Katyan et al., "Gel Formation in Nematic Liquid Crystal", Mentholatum.

* cited by examiner

*Primary Examiner* — Geraldina Visconti
(74) *Attorney, Agent, or Firm* — Foley & Lardner LLP

(57) ABSTRACT

This invention relates to a gel comprising a colloid dispersed in a lyotropic nematic liquid crystal, the lyotropic nematic liquid crystal comprising defect lines formed by the colloid. The invention also relates to a method for making the gel comprising the steps of: (a) mixing a nematogen with a liquid and the colloid to form a resulting dispersion, and (b) applying shear to the resulting dispersion at a temperature such that a lyotropic nematic liquid crystal phase is formed. In addition, the invention relates to an adhesive, lubricant, ceramic, film, spray, gel, lotion, foam, nanowire, yarn, medical implant, wearable, bone graft material, 3D printing material, ink, agrochemical formulation, topical formulation, paint, coating, composite, energy storage material, advanced material, responsive composite, cosmetic product, personal care product, pharmaceutical or foodstuff comprising the gel.

12 Claims, 24 Drawing Sheets

EXAMPLE PROOF OF CONCEPT: A confocal image slice of spheriglass (appearing as dark spots) dispersed at a volume fraction of 30% in a 0.5% wt cellulose solution containing fluorescein dye to highlight the structure in A) a standard dispersion and B) the nematic liquid crystalline phase revealing disclination networks.

Concentrated dispersion with Fluorescein in water
Scale bar = 20 microns

DEFECT MEDIATED LYOTROPIC NEMATIC GEL

CROSS-REFERENCE TO RELATED PATENT APPLICATIONS

This application is a U.S. National Phase Application under 35 U.S.C. § 371 of International Application No. PCT/GB2020/051479, filed Jun. 18, 2020, which claims the benefit of and priority to GB 1908811.1, filed on Jun. 19, 2019, each of which are incorporated herein by reference in their entirety.

This invention relates to a gel comprising a colloid dispersed in a lyotropic nematic liquid crystal, the lyotropic nematic liquid crystal comprising defect lines encircling the colloid, as well as to a method for forming such a gel and products comprising the gel.

BACKGROUND

Liquid crystals are a state of matter which have properties somewhere between those of conventional liquids and those of solid crystals. Liquid crystals exhibit a phase transition under different conditions. Thermotropic liquid crystals exhibit a phase transition as temperature is changed. Lyotropic liquid crystals exhibit phase transitions as a function of both temperature and concentration of the liquid crystal molecules in a solvent. Lyotropic liquid crystals form a variety of mesophases including nematic, chiral nematic, lamellar and cubic phases.

The solvent can be water (or at least 80% water), one or more organic compounds (or at least 80% being one or more organic compounds), one or more hydrocarbons (or at least 80% being one or more hydrocarbons), one or more organic oils (or at least 80% being one or more organic oils) or one or more silicone oils (or at least 80% being one or more silicone oils).

A common liquid crystal phase is the nematic. Nematic phases have no positional order, but have long-range orientational order. Mesogens (i.e. a compound which is capable of forming a liquid crystal) which can form a nematic phase are known as nematogens. Nematogens are anisotropic, that is one axis has a different length than the other two. For example, nematogens can be rod-shaped or disc-shaped. Lyotropic nematic phases can be formed when the aspect ratio is greater than 3. The aspect ratio of a nematogen is generally defined as the length of the longest axis divided by the length of the shortest axis.

Nematogens are rod-shaped in a calamatic phase and disk-shaped in a discotic or chromonic phase. The orientation of long-range order is known as the director. The director is along the long axis of nematogens for the calamatic phase and along the short axis of nematogens for the discotic or chromonic phase.

Nematic mesogens may align with some chirality thus generating a chiral nematic phase. The pitch length is the distance over which the orientation of the nematogens has completed one full rotation through the liquid crystal.

A lyotropic nematic phase may be formed by anisotropic colloids, anisotropic micelles or anisotropic molecules in a solvent.

Anisotropic colloids forming a nematic state are suspended within a liquid continuous phase. The long axis is between 1 nanometer and 1 micron. They may be organic or inorganic. Anisotropic colloids include clays, talcs, cellulose nanocrystals, carbon nanotubes, graphene, nanotubes formed from dipeptides, fairly rigid polymers (e.g. hydroxypropylcellulose) or large proteins. Anisotropic micelles forming a nematic state are formed by a mixture of more than one type of amphiphilic molecule, often called a surfactant and co-surfactant. Amphiphilic molecules have both hydrophilic and hydrophobic parts and can aggregate in a solvent to form micelles such that the outside of the micelle is soluble in the solvent. Amphiphiles may include proteins, surfactants, lipids, fatty acids, glycolipids and amphiphilic nanocolloids.

Anisotropic molecules can be inflexible or semi-flexible polymers (e.g. hydroxypropylcellulose or proteins) or can include the class of chromonic lyotropic liquid crystalline phases. Chromonic compounds refers to large multi-ring molecules typically characterized by the presence of a hydrophobic core, containing aromatic or non-aromatic rings, surrounded by various hydrophilic groups and dispersed in a liquid continuous phase. Chromonic compounds include folic acid, disodium 6-hydroxy-5-[(4-sulfophenyl) azo]-2-naphthalenesulfonate (i.e. Sunset Yellow) or disodium cromolyn.

Occasionally, the director of the nematic changes abruptly and this creates a defect which can take the form of a point or line. A defect line is also known as a disclination. Dispersed colloids can nucleate a variety of defect points or lines within a liquid crystal. Weak, normal anchoring of nematogens on a colloid surface is known to generate a defect with quadrupolar symmetry that creates a defect line, called a Saturn-ring defect that encircles the colloids. Weak anchoring is defined as when the generalised Frank elastic constant of the liquid crystal is greater than the dispersed colloid radius multiplied by the anchoring strength of the nematogen.

The dispersed colloid may be solid, liquid or gas of any material. As used herein, the dispersed colloid may have a radius between 10 nanometers and 50 micrometers. The surface chemistry of the colloid may be modified with the use of surfactants, dispersants or emulsifiers. If used with colloidal nematogens, the dispersed colloid can be larger than five times the long axis of the nematogen.

Thermotropic nematic liquid crystals comprising colloids which form defect lines (known as disclinations) are described in Science, 334, 99 (2001 (T. A. Wood et al).

STATEMENT OF INVENTION

It has been surprisingly found by the inventors that defect lines arise around colloids dispersed in lyotropic nematic liquid crystals which may be used to produce materials with useful mechanical qualities with a broad range of applications.

This invention relates to a gel comprising a colloid dispersed in a lyotropic nematic liquid crystal, the lyotropic nematic liquid crystal comprising defect lines formed by the colloid. These gels have a high storage modulus, exhibit glassy dynamics and thus long-term stability, and are shear-thinning. The defect lines may also be described as "encircling" the colloid (or colloid particles). A lyotropic nematic liquid crystal generally comprises a nematogen which is dissolved in liquid (e.g. a solvent). Without wishing to be bound by theory, it was not understood or suggested in the art that lyotropic nematic phases would have sufficient thermodynamic stability or Frank elasticity to stabilise such defects. In the context of the invention, the term "colloid" is used to refer to a substance dispersed in the lyotropic nematic liquid crystal.

In particular, the nematogen may be a chiral nematogen having a pitch length which is larger than the largest dimension of the dispersed colloid.

More particularly, the director of the nematic phase may be perpendicular to the surface of the colloid in order to promote defect lines.

In particular, the gel may have a storage modulus as measured by oscillatory rheology of $1$-$10^6$ Pa, more particularly $10^2$-$10^6$ Pa, even more particularly $10^2$-$10^4$ Pa. The oscillatory rheology may be carried out at a frequency of 1 Hz and amplitude lower than 1%. In particular, in relation to the storage modules (G') and loss modules (G") as measured by oscillatory rheology, G"/G' may be 0.5-1.5, more particularly 0.8-1.2, even more particularly 0.9-1.1 for regions of oscillatory frequency between 0.1 and 10 cycles/s.

The viscosity of the gel can be defined by the formula:

$$\eta \alpha \dot{\gamma}^{(n-1)}$$

Where η is the measured viscosity, which is proportional to the shear rate, to the power of (n−1) where n is the flow behaviour index. More particularly, the gel may have a flow behaviour index n of 0-0.5, even more particularly 0-0.40, more particularly 0.05-0.30. In particular, the flow behaviour index may be measured using sandblasted parallel plates on a strain-controlled rheometer.

More particularly, the material which forms the lyotropic nematic liquid crystal (i.e. the nematogen) may have an aspect ratio greater than 3:1, even more particularly greater than 4:1. In particular, the aspect ratio may be less than 10:1. In particular, the nematogen may be selected from materials which are capable of forming anisotropic micelles, anisotropic colloids or anisotropic molecules. When the nematogen is a colloid, its longest axis is generally at least ten times smaller than that of the colloid which is dispersed in the lyotropic nematic liquid crystal.

Anisotropic micelles may be formed from amphiphilic polymers, glycolipids, lipids, fatty alcohols, surfactants, or mixtures of these. The term "fatty alcohol" is used to refer to an alcohol comprising 4-26 carbon atoms, more particularly to a straight-chain primary alcohol. More particularly, the lipid may be a mixture of dimyristoylphosphatidylcholine (DMPC) with either dihexanoylphosphatidylcholine (DHPC) or 3-(cholamidopropyl)dimethylammonio-2-hydroxy-1-propanesulfonate (CHAPSO). More particularly, the surfactant may be sodium dodecyl sulphate (SDS), a sucrose ester or a polysorbate. In particular, the fatty alcohol may be decanol and the surfactant may be sodium dodecyl sulphate (SDS). Anisotropic colloids may be formed from mineral particles or organic material. The anisotropic colloids may be naturally occurring or synthetic. More particularly, the mineral particles may be selected from montmorillite, bentonite, talc, calcium carbonate, graphene oxide, carbon nanotubes. Anisotropic colloids may be formed from organic material e.g. cellulose, nanocrystalline cellulose, collagen, chitin, actin, collagen, silk proteins or dipeptide structures. In particular, the nematogen may be nanocrystalline cellulose or hydroxypropylcellulose, more particularly nanocrystalline cellulose. In particular, the nanocrystalline cellulose may be modified to improve charge stabilisation, in particular with (2,2,6,6-Tetramethylpiperidin-1-yl)oxyl (TEMPO) or sulphate groups.

Anisotropic molecules may include folic acid, disodium 6-hydroxy-5-[(4-sulfophenyl)azo]-2-naphthalenesulfonate (i.e. Sunset Yellow), disodium cromolyn or di-peptides. More particularly, the anisotropic molecule may be Sunset Yellow.

In particular, the solvent may comprise water, an organic compound, a hydrocarbon, an organic oil or a silicone oil, more particularly water. More particularly, the solvent may be at least 80 wt % of one of water, an organic compound, a hydrocarbon, an organic oil or a silicone oil, more particularly water. In particular, the organic compound may comprise, or be at least 80 wt % of, glycerol and/or ethanol. More particularly, the solvent may comprise, or be at least 80 wt % of, water, glycerol, ethanol, an organic oil or a silicone oil. The weight fraction quoted here is relative to the solvent alone.

More particularly, the dispersed colloid is a solid, liquid or gas having a surface which promotes normal anchoring of nematogens. In particular, the colloid dispersed in the liquid crystal may be selected from melamine particles, polymethylmethacrylate particles, inorganic oxide particles, anionic polystyrene particles, cationic polystyrene particles, cornflour particles, glass particles (e.g. soda-lime glass such as Spheriglass 3000 or 5000), silica particles (e.g. Zeodent 113 or Zeodent 153), titania particles, calcite particles, hydroxyapatite particles, sunflower oil, silicone oil and air. The surface of the colloids may be modified through chemical treatment, e.g. grafting of polymer, or physical treatment e.g. use of dispersants or emulsifiers. More particularly, the polymethylmethacrylate (PMMA) particles additionally comprise poly-12-hydroxy-stearic acid (PHSA) or polyvinylpyrrolidone (PVP). The PHSA and PVP can stabilise the PMMA particles. In particular, the silicone oil may be silicone oil 50 cSt or polydimethyl siloxane (PDMS). Silicone oil may be used in combination with micellar nematic phases. More particularly, the oil may be a sunflower oil. Sunflower oils may be used in combination with nanorod nematic phases. Suitably, the surface of the dispersed colloid is chemically or physically modified to promote normal anchoring of nematogens. The dispersed colloid may comprise either (a) polymethylmethacrylate particles with poly-12-hydroxy-stearic acid or polyvinylpyrrolidone grafted to the particle surface, or (b) silicone oil (e.g. emulsion droplets) with (e.g. stabilised by) sodium dodecyl sulphate Particular combinations of lyotropic nematic liquid crystals and colloids include (i) Sunset Yellow with particles comprising PMMA or PMMA and PVP, (ii) Sunset Yellow with melamine particles, (iii) decanol and SDS with particles comprising PMMA or PMMA and PVP, (iv) decanol and SDS with anionic polystyrene, (v) decanol and SDS with cationic polystyrene, (vi) cellulose, more particularly nanocrystalline cellulose, optionally modified with TEMPO, with particles comprising PMMA or PMMA and PVP. In all of these cases, the solvent comprises water.

More particularly, the gel may comprise a colloid in a volume fraction of 10-55%. The desired volume fraction depends upon the use to which the gel is to be put. In particular, the volume fraction can be 20-50%, 25-40%, or 35-45%. The volume fraction quoted here is relative to the gel as a whole.

This invention also relates to a method for making a gel as described above, the method comprising the steps of:
(a) mixing a nematogen with a liquid and the colloid to form a resulting dispersion, and
(b) mixing the resulting dispersion at a temperature such that a lyotropic nematic liquid crystal phase is formed In particular, mixing in step (a) may be by one or more of sonicating, vortex mixing or stirring. More particularly, the mixing in step (b) may be by the application of shear through shear mixing, flowing, spreading, extruding or injecting.

In step (a), the mixing can be in any order. For example, the nematogen and the liquid can be mixed before the colloid is then added. Alternatively, the nematogen and the colloid can be mixed before the liquid is added.

In addition, this invention relates to compositions, products or combinations thereof relating to or having use of application in the products for the treatment, cleaning, caring or conditioning of the person or of surfaces, furniture and atmosphere of the home and household contents and of clothes, fabrics and/or cloth fibres. It includes adhesives, lubricants, ceramics, films, sprays, gels, lotions, foams, nanowires, yarns, medical implants, wearables, bone graft material, 3D printing material, inks, agrochemical formulations, topical formulations, paints, coatings, composites, energy storage materials, advanced materials, responsive composites, cosmetic products, personal care products, pharmaceuticals, foodstuff comprising the gel as described above.

This invention will be further described by reference to the following Figures which are not intended to limit the scope of the invention claimed, in which:

FIG. 1(a) shows a cross-polarised microscopy image of quadrupolar entangled defects surrounding 3 micron diameter melamine particles in a chromonic nematic phase of Sunset Yellow, 20 microns across the field of view, FIG. 1(b) shows microscopy of the same system at low magnification (20×) showing cluster formation, FIG. 1(c) shows 1 micron diameter PMMA-PVP particles in a chromonic nematic phase of Sunset Yellow at high magnification (x63 oil objective on Zeiss confocal microscope), FIG. 1(d) shows microscopy of the same system at high magnification (63×) showing string formation, FIG. 2 shows a graph of the storage (G') modulus of a dispersion of melamine colloids in the nematic phase of the chromonic Sunset Yellow in water as a function of volume fraction, FIG. 3 shows measured dynamic viscosity as a function of the stress applied, under oscillatory rheology at a strain of 1% and frequency of 1 Hz, for a 30% volume fraction of melamine particles dispersed in the nematic phase of Sunset Yellow, particle diameters ~3 microns, FIG. 4 shows a fluorescent confocal micrograph of anionic colloids creating percolating networks in a lyotropic nematic of SDS, decanol and water, FIG. 5(a) shows storage modulus (G') as a function of volume fraction for uncharged PMMA-PHSA particles in 5CB (black circles), uncharged PMMA-PVP in NC1 (black squares), and negatively charged (anionic) polystyrene particles in NC1 (grey triangles), FIG. 5(b) shows loss modulus (G") as a function of volume fraction for uncharged PMMA-PHSA particles in 5CB (open black circles), uncharged PMMA-PVP in NC1 (open black squares), and negatively charged (anionic) polystyrene particles in NC1 (open grey triangles), FIG. 6 shows storage modulus (G') as a function of a large volume fraction range from 0.1 to 50% for uncharged PMMA-PHSA particles in 5CB (black circles), uncharged PMMA-PVP in NC1 (black squares), negatively charged (anionic) polystyrene particles in NC1 LCs (grey triangles) and positively charged (cationic) polystyrene particles in NC1 LCs (black triangles), FIG. 7(a) shows storage modulus (G') as a function of volume fraction for solid particles comprising PMMA-PVP in NC1, and an emulsion of silicone oil in NC1, FIG. 7(b) shows loss modulus (G") as a function of volume fraction for solid particles comprising PMMA-PVP in NC1, and an emulsion of silicone oil in NC1, FIG. 8 shows storage (G') (solid symbol) and loss (G") (open symbol) moduli as a function of angular frequency for 30% of PMMA-PVP in NC1 (higher curves), and NC1 alone (lower curves), FIG. 9(a) shows the measured shear viscosity of PMMA in NC1 as a function of shear rate for a range of volume fractions, FIG. 9(b) shows the measured stress of PMMA in NC1 as a function of shear rate for a range of volume fractions, FIG. 10(a) shows storage (G') (solid symbol) and loss (G") (open symbol) moduli as a function of strain for a low volume fraction material comprising 7% wt PMMA-PVP colloids in a nematic cellulose solution, FIG. 10(b) shows storage (G') (solid symbol) and loss (G") (open symbol) moduli as a function of strain for a high volume fraction material comprising 44% wt PMMA-PVP in a nematic cellulose solution, FIG. 11(a) shows storage (G') (solid symbol) and loss (G") (open symbol) moduli as a function of frequency for a low volume fraction material comprising 7% wt PMMA-PVP colloids in a nematic cellulose solution, FIG. 11(b) shows storage (G') (solid symbol) and loss (G") (open symbol) moduli as a function of frequency for a high volume fraction material comprising 44% wt PMMA-PVP colloids in a nematic cellulose solution, FIG. 12 shows a cross-polarised microscopy image of 1 micron diameter PMMA-PHSA in 5CB, FIG. 13 shows storage (G') (solid symbol) and loss (G") (open symbol) moduli as a function of frequency for a 30% volume fraction material comprising PMMA-PHSA in 5CB, FIG. 14(a) shows Tan δ=G"/G' as a function of angular frequency for a 30% volume fraction material comprising PMMA-PHSA in 5CB for different amplitudes of applied strain, FIG. 14(b) shows a graph of the critical angular frequency for gel disruption as a function of strain when δ=1 for a 30% volume fraction material comprising PMMA-PHSA in 5CB, FIG. 15(a) shows the shear viscosity of PMMA-PHSA colloid in 5CB as a function of shear rate for a range of volume fractions, FIG. 15(b) shows the stress of PMMA-PHSA colloids in 5CB as a function of shear rate for a range of volume fractions, FIGS. 16(a) and (b) show a photograph of adhesive and stretch behaviour for a composite of volume fraction of 49% PMMA-PHSA in 5CB is pulled apart between substrates FIGS. 17(a) and (b) show storage (G') and loss (G") moduli for a φ=0.18 dispersion of Zeodent 113 in NC1 solution measured using oscillatory rheology showing (a) a strain amplitude sweep at f=1 Hz and (b) a frequency sweep at Y=1%, FIG. 18 shows storage (G') and loss (G") moduli for a φ=0.3 dispersion of spheriglass 5000 dispersed in aqueous cellulose nematic solution measured at a strain Y=1%, FIG. 19 shows confocal microscopy of (right) φ=0.3 dispersion of spheriglass 5000 dispersed in aqueous cellulose nematic solution compared with a dispersion of φ=0.3 dispersion of spheriglass 5000 in water (left). Fluorescein dye was added which illuminates the background aqueous phase surrounding the particles. The insets show the appearance of a film of the material smeared onto a glass slide.

FIGS. 20(a) and (b) show φ~30% cornflour dispersions in aqueous cellulose nematic solutions were tested using (a) oscillatory rheology over a range of frequencies at an applied strain of 1% and (b) through measuring the viscoelastic recovery, at f=1 Hz and a strain amplitude of Y=1% after a preshear of rate 10/s was applied to the sample for 1 minute.

Figure 23A:
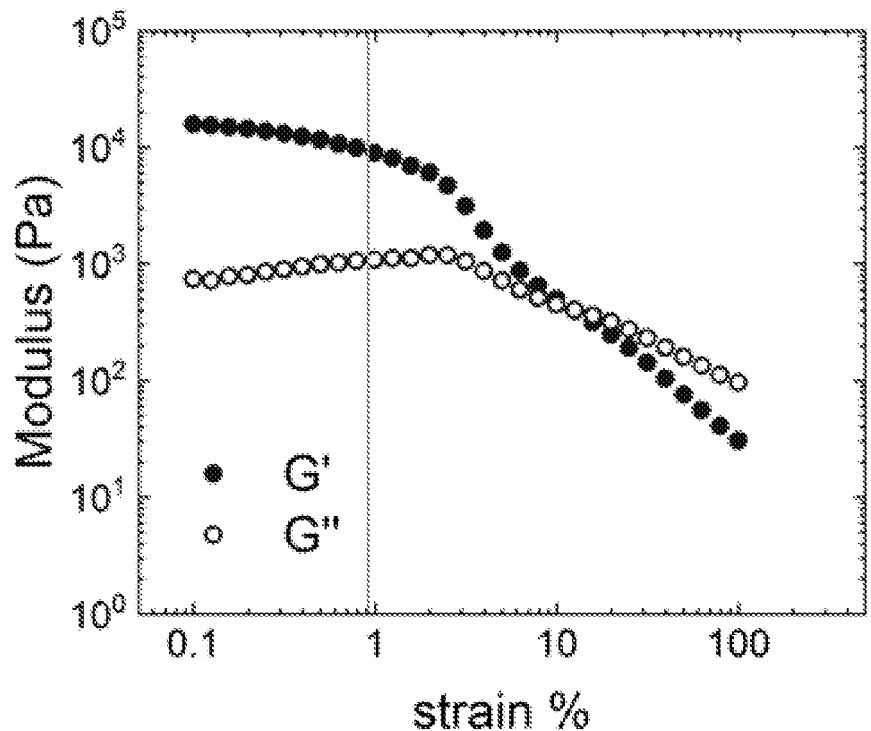

FIGS. 23(a) and (b) show the storage (solid) and loss (open) moduli, measured through oscillatory rheology at a frequency of 1 Hz (6.28 rad/s) as the strain amplitude is increase for φ~0.25 dispersion of (a) Zeodent 113 and (b) Zeodent 153.

Figure 24:
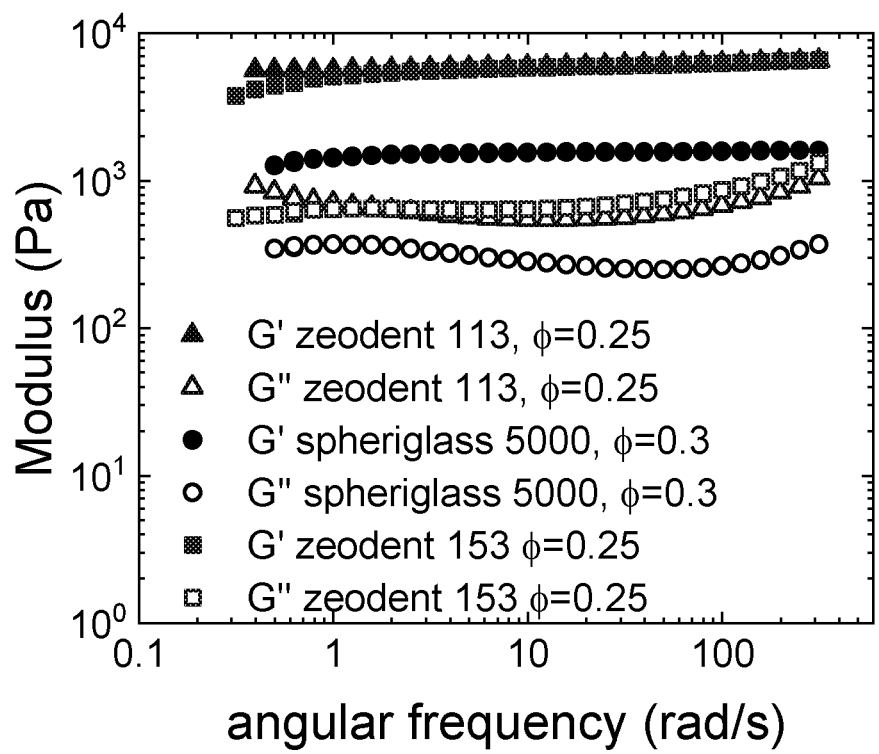

FIG. 24 shows dispersions of φ~25% Zeodent 113 and Zeodent 153 compared with the results for φ~30% Spheriglass 5000 in aqueous cellulose nematic solution when measured using oscillatory rheology over a range of frequencies at an applied strain of 1%.

Figure 25:
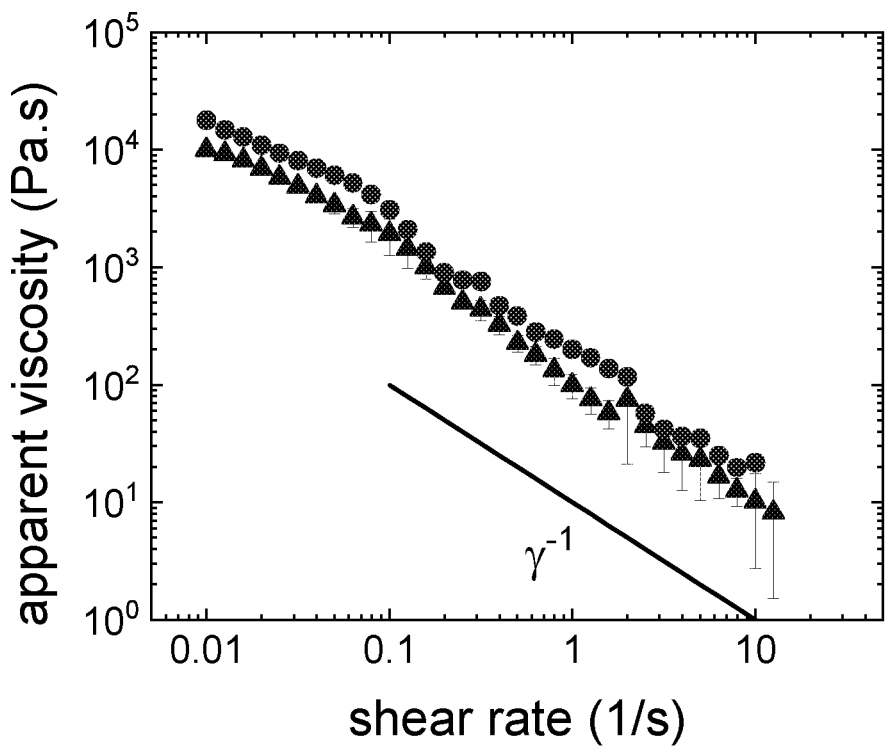

FIG. 25 shows the apparent viscosity of dispersions of φ~25% Zeodent 113 (circles) and Zeodent 153 (triangles) in aqueous cellulose nematic solutions was measured using flow rheology over a range of shear rates from 0.01 to 10 $s^{-1}$. A gradient with an exponent of −1 is show for comparison.

Figure 26:
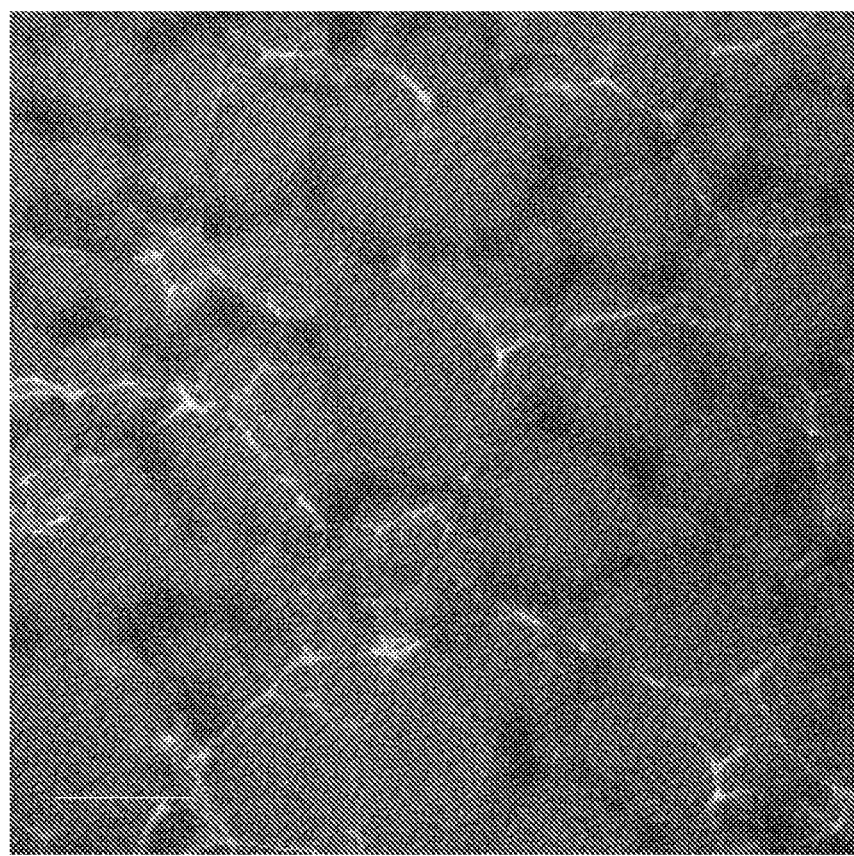

FIG. 26 shows a micrograph, collected using confocal microscopy, of an emulsion of 30% sunflower oil, without surfactant, in an aqueous cellulose nematic solution. The scale bar is 20 microns. The sample has been allowed to dry in the air before imaging.

Figure 27A:
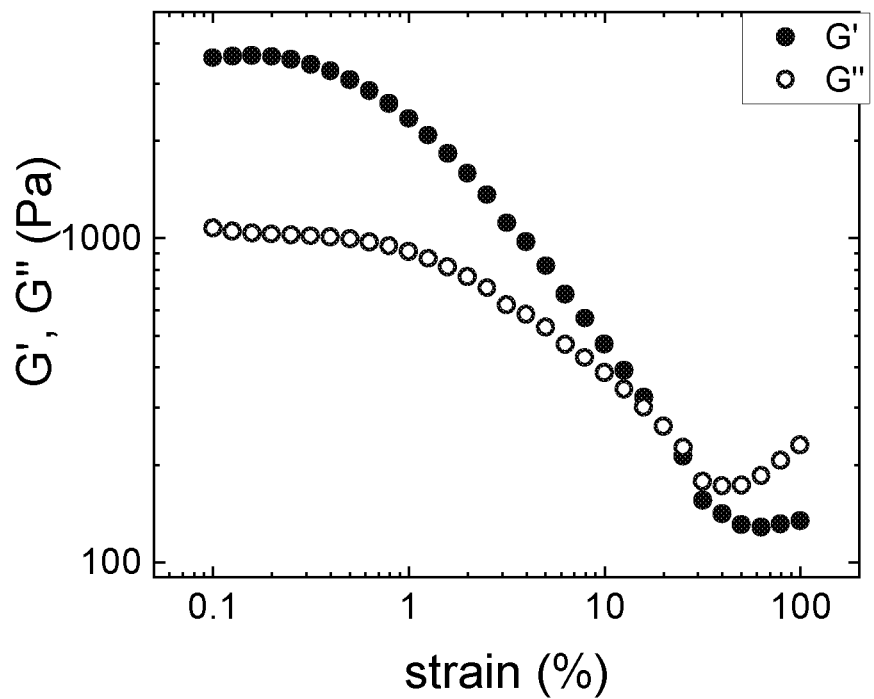

FIGS. 27(a) and (b) show storage (G') and loss (G") moduli for a 33 wt % dispersion of Zeodent 113 in cellulose nematic glycerol solution measured using oscillatory rheology showing (a) a strain amplitude sweep at f=1 Hz and (b) a frequency sweep at Y=0.5%.

Figure 28A:
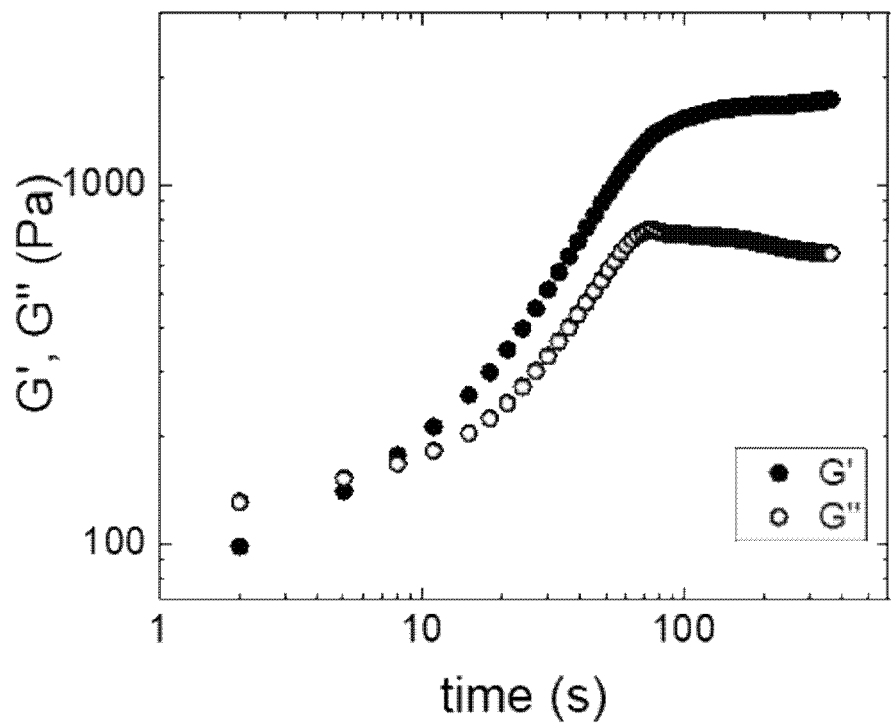

FIGS. 28(a) and (b) show (a) storage (G') and loss (G") moduli for a 33 wt % dispersion of Zeodent 113 in cellulose nematic glycerol solution measured using oscillatory rheology, at f=1 Hz and a strain amplitude of Y=0.5%, showing recovery of viscoelastic behaviour after pre-shear applied at a rate of 10/s; and (b) shear flow behaviour as a function of the shear rate.

Figure 29:
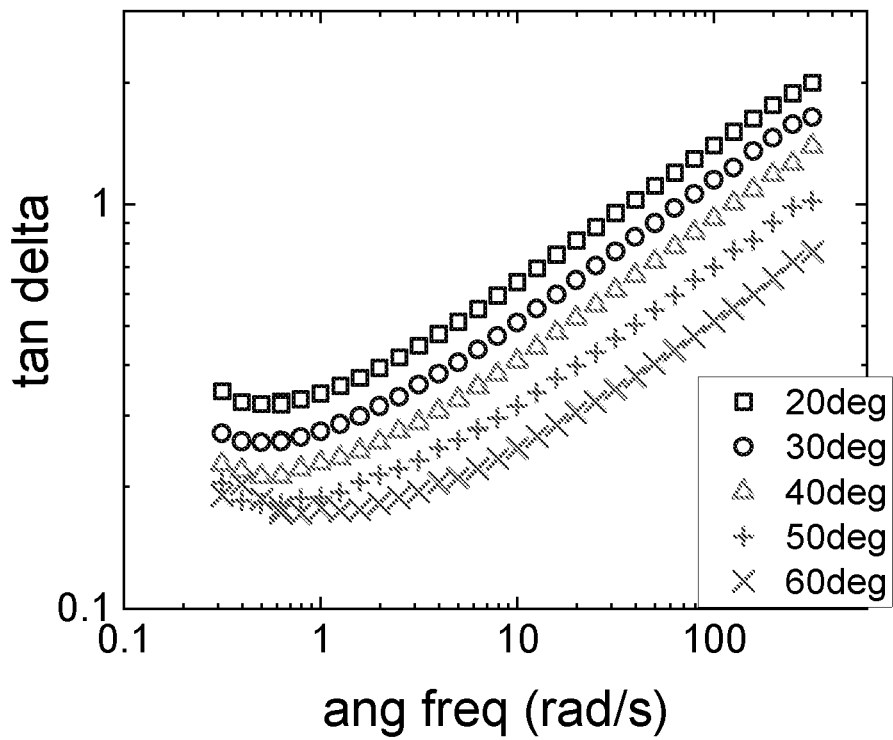

FIG. 29 shows tan delta=G"/G' measured using oscillatory rheology, at f=1 Hz and a strain amplitude of Y=1%, for a 33 wt % dispersion of Zeodent 113 in cellulose nematic glycerol solution for a range of temperatures between 20 to 60° C.

EXAMPLES

Example 1—Anisotropic Molecules (Chromonic Lyotropic Phases)

An example of a chromomic lyotropic nematic phase is the dye Sunset Yellow. The phase diagram of Sunset Yellow has been characterised (e.g. H.-S. Park et al. J. Phys. Chem. B 112, 16307-16319, 2008) and it has a clear nematic region at room temperature. In a chromonic liquid crystal, the molecules are disk shaped and stack to form anisotropic building blocks that form the nematic phase. Therefore, the director is parallel to the short plane of the molecule so that it is important to have the long plane of the molecule lying flat to colloid surface. A defect mediated gel was achieved when melamine colloids were dispersed to achieve normal anchoring of the director.

Sunset Yellow was purchased from Sigma Aldrich (~90% purity) and was purified by dissolving in deionized water and subsequently adding ethanol to cause precipitation of the dye. The precipitate was filtered from the solvent (containing impurities) and dried in an oven. The procedure was repeated twice.

For example, with Sunset Yellow a nematic phase forms around 1-1.1 mol/kg at room temperature. A stock solution was made by combining 5.5437 dry sunset yellow powder with 11.2265 grams of water. Colloids were mixed into the nematic phase using vortex mixing and a spatula. One specific composite had 0.3687 g melamine colloids, diameter 3 microns, combined with 0.5014 g of nematic Sunset Yellow stock solution. To show that not all colloids generate quadrupolar defects, due to normal anchoring, generating gel strength at volume fractions >15%, 1 micron diameter poly(methyl)methacrylate (PMMA) particles stabilised with polyvinylpyrrolidone (PVP) particles were dispersed in the nematic phase of sunset yellow.

Figure 1A:
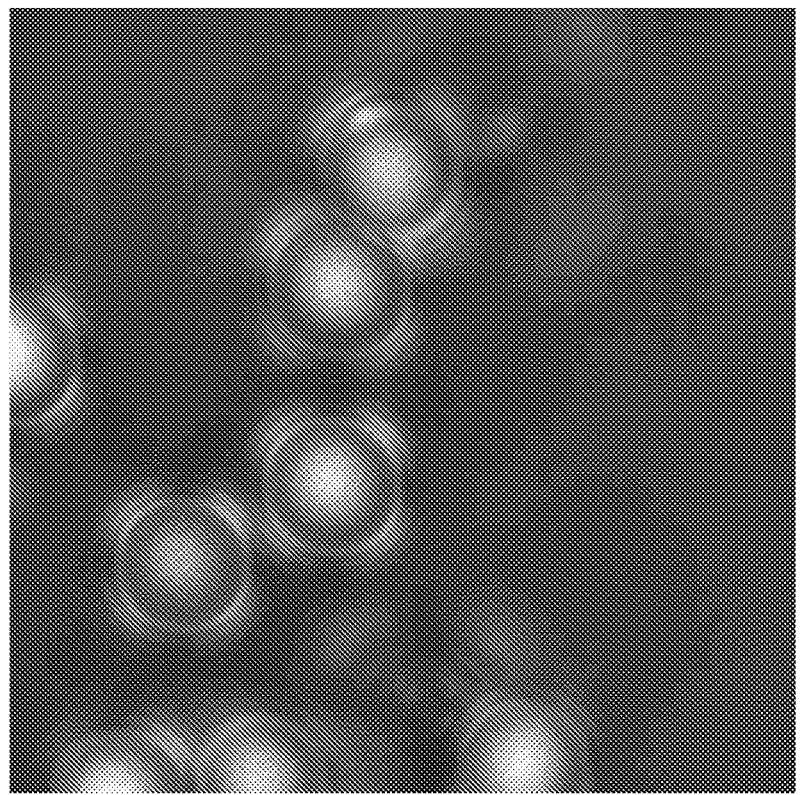
Figure 1B:
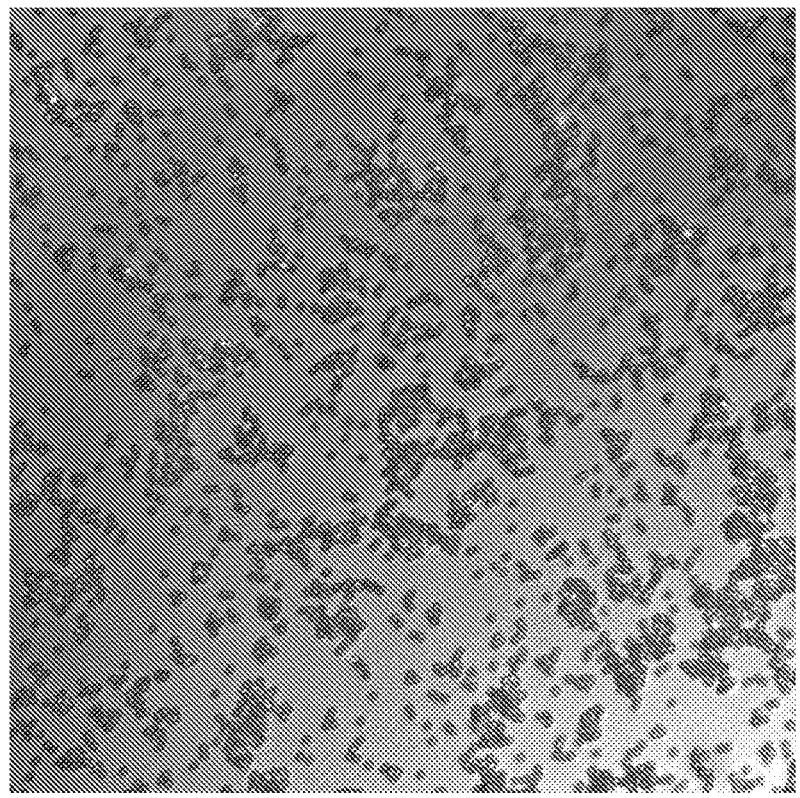
Figure 1C:
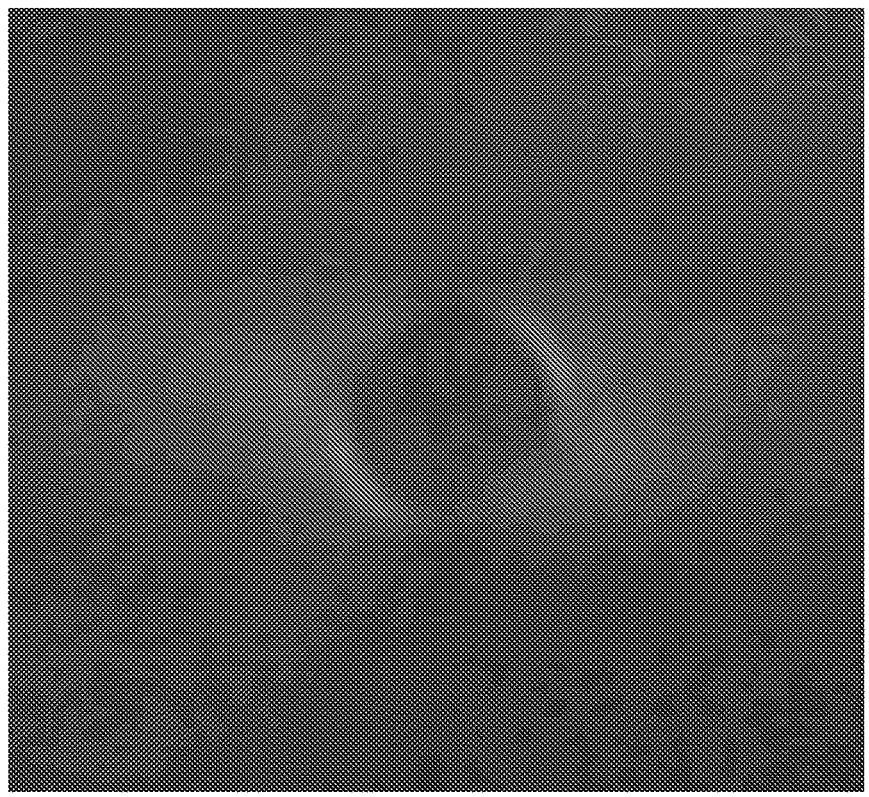
Figure 1D:
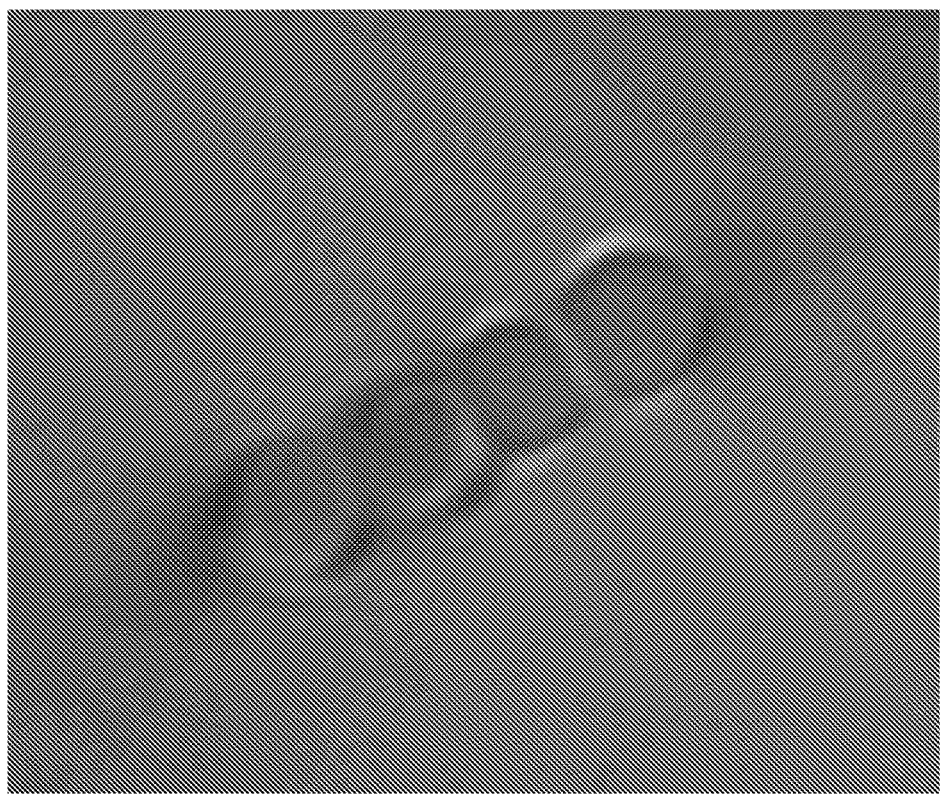

FIG. 1(a) shows quadrupolar defects around melamine colloids in the nematic phase of sunset yellow. It is possible to see that some neighbouring defects are entangled at high magnification. At low magnification, as shown in FIG. 1(b), it can be seen that at low concentrations colloids assemble in disordered aggregated. PMMA-PVP particles dispersed in Sunset Yellow do not generate quadrupolar defects, because the nematic director lies parallel to the colloid surface, as shown in FIG. 1(c), and this results in string formation FIG. 1(d) which is typical of the boojum defect observed when the director aligns parallel to the surface of a colloid.

Figure 2:
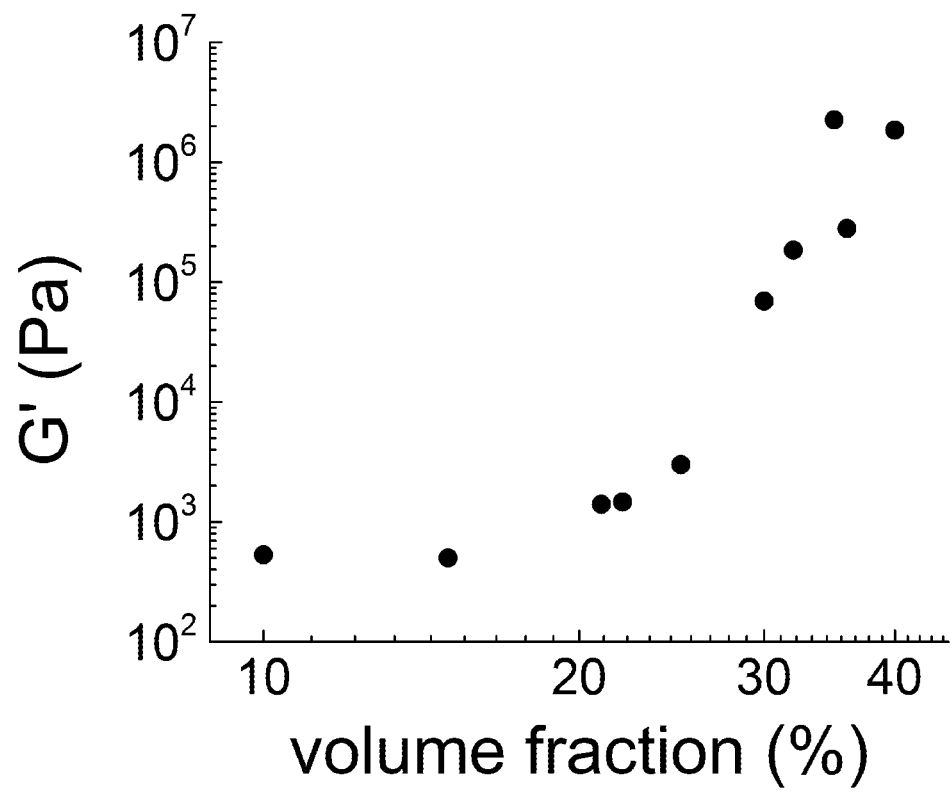

Oscillatory rheology was performed on samples of Sunset Yellow at various volume fractions of the melamine colloid. The oscillatory rheology was performed on a parallel plate geometry whose surface was sandblasted. The temperature of the system was kept at 25±1° C. The strain was varied from 0.001 to 100%. This is shown in FIG. 2. G' is a measure of the elastic property (or stiffness) of the materials while G" is a measure of the viscous property (or ability to flow). G' for a dispersion of melamine in Sunset Yellow, rises at concentrations >15% volume fraction and G'>G".

Figure 3:
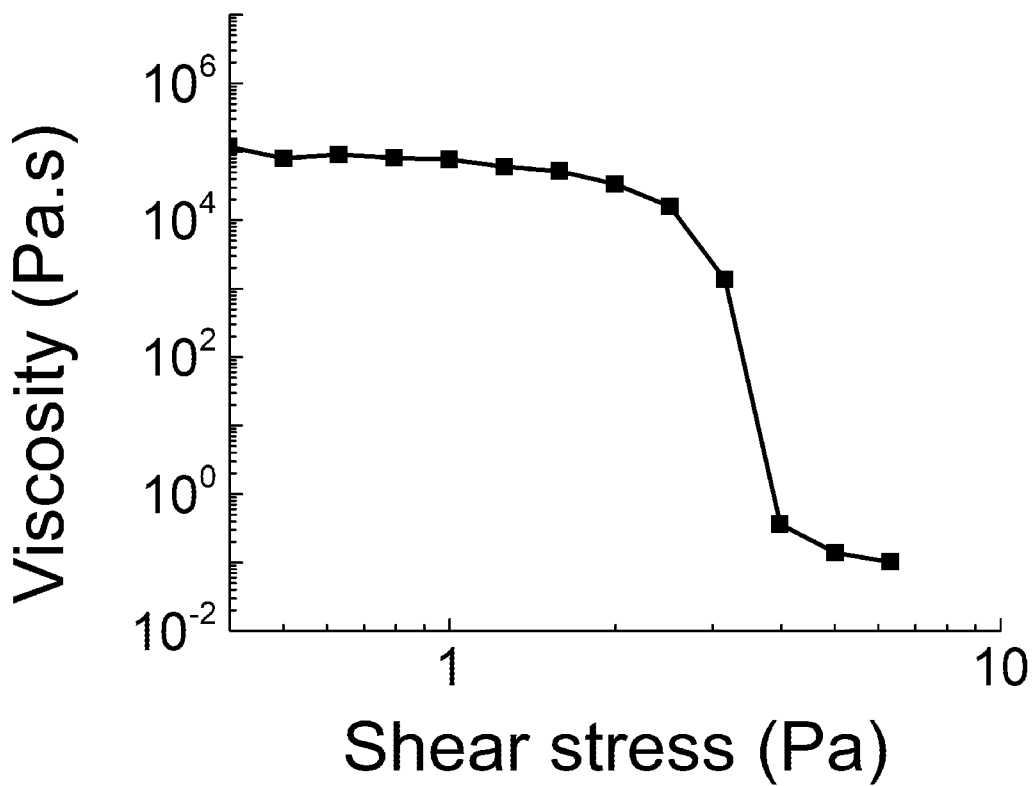

The shear thinning behaviour of a 30% volume fraction of melamine particles dispersed in Sunset Yellow was tested. Geometry and temperature were same for steady state flow measurements. Shear rate was applied in steps from 0.001 to 1000/s. The results are set out in the graph in FIG. 3, which shows that the viscosity significantly reduced at a shear stress of around 4-5 Pa.

Example 2—Anisotropic Micelles, e.g. Surfactants and Co-Surfactants in a Solvent Rod-like uniaxial micelles made of SDS and Decanol dispersed in water were studied. This material is referred to as NC1 (nematic calamatic 1).

Preparation of NC1 liquid crystal: Sodium dodecyl sulfate (SDS) 99% and 1-decanol 98% were purchased from Sigma Aldrich (U.K.) and was used without any further purification. For making NC1 LCs, typically SDS=24.8±0.2 wt % and deionized water=70.40±0.19 wt % were first thoroughly mixed using vortex mixture for 120 seconds. 1-Decanol=4.80±0.04 wt % was then added to the SDS water mixture and thoroughly mixed. The addition of fatty alcohol removes some amount of bubbles formed from mixing SDS and water. The ternary mixture was then sonicated for 10 minutes to remove any remaining bubbles. When the mixtures appeared to be homogenous by visual inspection they were left to sit on a shelf for 24 hours before using them in the experiments. Sample vials were sealed with paraffin to avoid any mass loss of constituents. NC1 phase remains nematic from 23 to 32° C. for this composition.

Dispersion of solid colloids in NC1: A different routine was followed for dispersing colloids in NC1. First, dried PMMA colloids stabilised with polyvinylpyrrolidone (PVP) were dispersed in deionized water using vortex mixture. Then, the desired amount of SDS and Decanol was added to the above mixture so that water, 1-decanol and SDS form NC1 phase (see 0045). The composites formed were mixed with spatula and then sonicated for 5-10 minutes to remove any bubbles present. All the sample vials were sealed using paraffin to avoid any mass loss of constituents. PMMA particles of diameter ~1 micron were dispersed at volume fractions between 5% and 45% and the invention was observed at volume fractions above 20%.

The same protocol was followed to prepare anionic polystyrene in NC1 and cationic polystyrene in NC1 LCs.

Dispersion of liquid colloids in NC1 (making an emulsion): To make LCs emulsion the desired amount of SDS and Water was first mixed in a vial using a Silverston shear mixture at a rate of 6000 rpm. The desired amount of PDMS (Polydimethyl siloxane) was then added in batches to the SDS and water mixture. After the emulsion had become opaque, 1-decanol was added to form the NC1 phase. The size of droplets formed in the NC1 LCs emulsion depends upon the shear rate and time of mixing. A shear rate of 6000 rpm for 120 s was used to create droplets of 4 microns in diameter. It is important to keep the droplet size sufficiently small to ensure the formation of the quadrupolar defect structure. This is defined by keeping Wr/K<<1, where W is the anchoring energy between colloids and LCs (W), r is the colloid radius and K is the elastic constant of the LCs. Volume fractions were studied between 5% and 45% and the gel behaviour was observed at volume fractions above 20%. A specific example is a 30% volume fraction of silicone oil mixed into the NC1 phase. In the system tested, nonpolar oils with SDS/Decanol could not be used because they changed the phase diagram of the SDS/Decanol system (in this case forming a lamellar phase).

Figure 4:
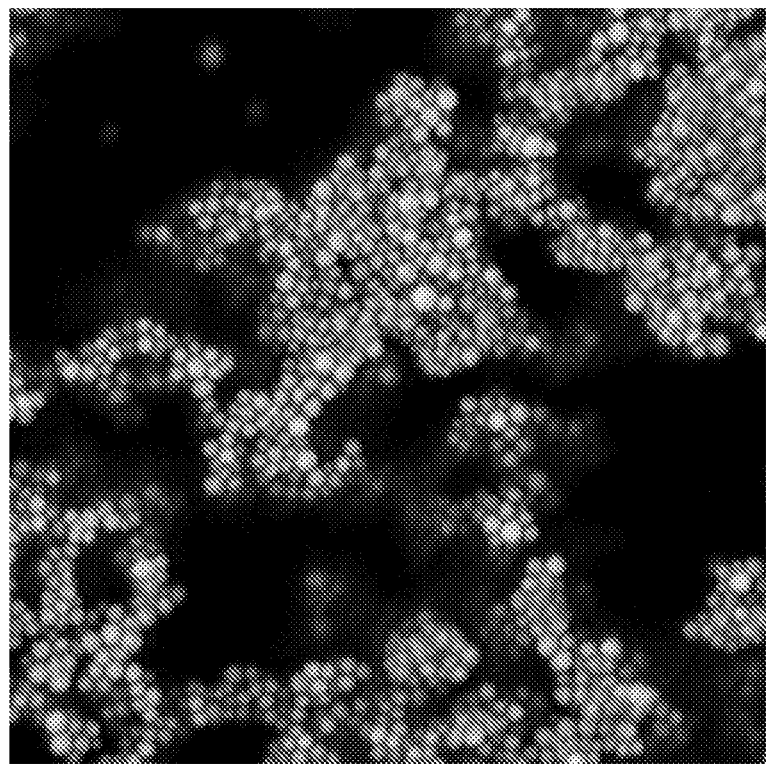

The samples were analysed by microscopy. In a surfactant-rich nematic phase only homeotropic anchoring of the calamatic nematic director was observed. In this context, the term "surfactant-rich" means a concentration of surfactant higher than the CMC (critical micelle concentration), which is 5 mM for SDS in water. The inventor also found that the director tends to lie homeotropic to the glass substrates during imaging so it is not easy to photograph the director field between crossed-polarisers. However, random aggregation of the particles indicates that the particles are interacting through quadrupolar interactions. A fluorescent confocal micrograph of anionic colloids creating percolating networks in a lyotropic nematic of sds, decanol and water is shown in FIG. 4.

Figure 5A:
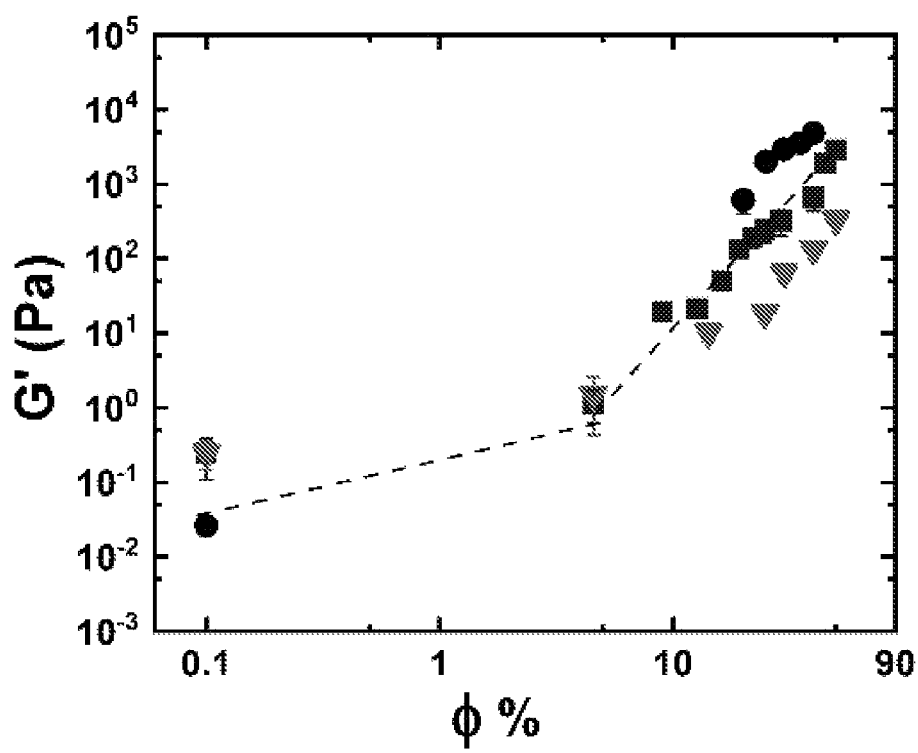
Figure 5B:
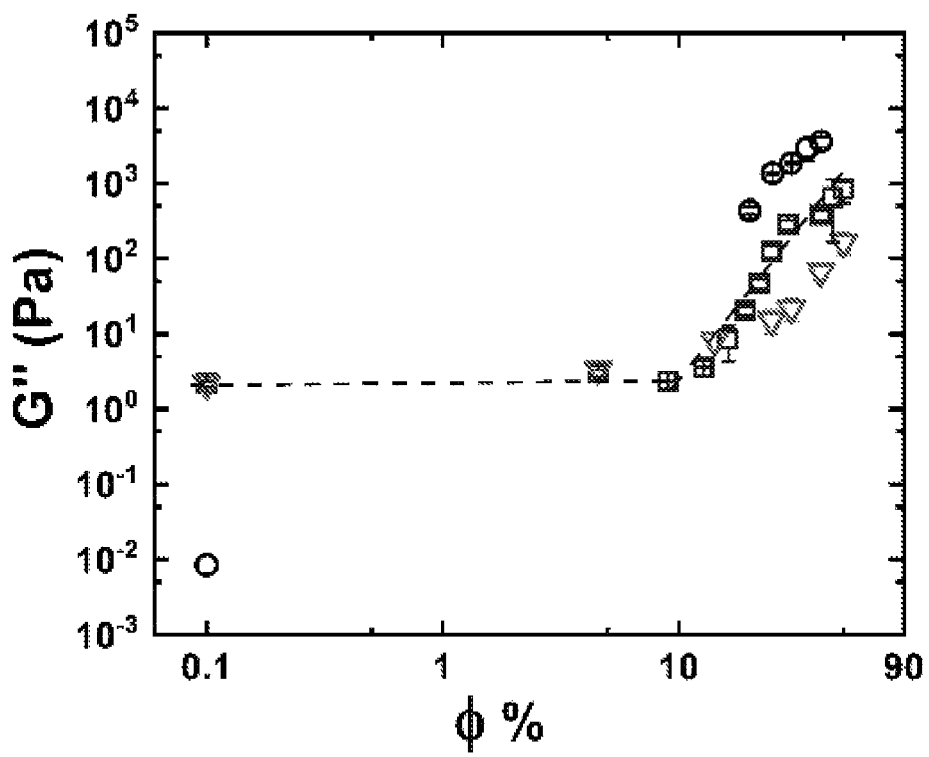

Storage modulus: The samples were characterised as follows: (i) PMMA-PHSA (PHSA=poly-12-hydroxystearic acid) in 4-cyano-4'-pentylbiphenyl (5CB), (ii) PMMA-PVP in NC1, and (iii) Anionic polystyrene particles in NC1. The storage modulus (G', see FIG. 5(a)) and loss modulus (G", see FIG. 5(b)) as a function of volume fraction of the particles.

The storage and loss moduli of colloids dispersed in the uniaxial micellar nematic increase are observed to increase above volume fractions of 10%. It is observed that negative charge on the colloids (anionic polystyrene) weakens the stiffness when compared with the uncharged colloids (PMMA-PVP). Cationic colloids recover the strength. These observations suggest that charge interactions can weaken or strengthen the gel for a fixed volume fraction. Therefore, the user could use cationically charged surfactants to pre-treat anionic colloids before dispersing the colloids in a nematic carrying negatively charge micelles, to ensure good anchoring of nematogens.

Figure 6:
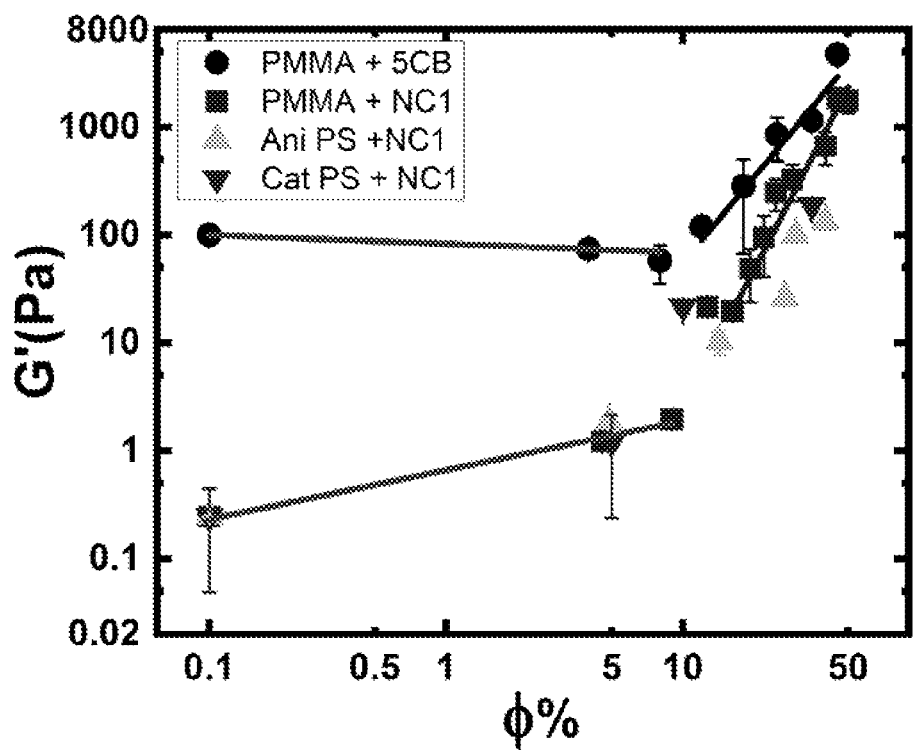

The storage modulus of the linear viscoelastic regime measured through an oscillatory strain ramp was then measured for poly(methyl)methacrylate (PMMA) stabilised with poly (12 hydroxy) stearic acid (PHSA) in the thermotropic nematic 4-cyano-4'pentylbiphenyl (5CB) (taken from Wood et al, Science 2011), for the lyotropic nematic calamatic phase with 24.8 wt % of SDS, 4.8 wt % of Decanol in water with anionic polystyrene particles with a surface charge of −30 $\mu C/m^2$ (green), cationic polystyrene with a surface charge of 13 $\mu C/m^2$ (dark red) and PMMA stabilised with polyvinylpyrrolidone (PVP), uncharged. These results are shown in FIG. 6.

Figure 7A:
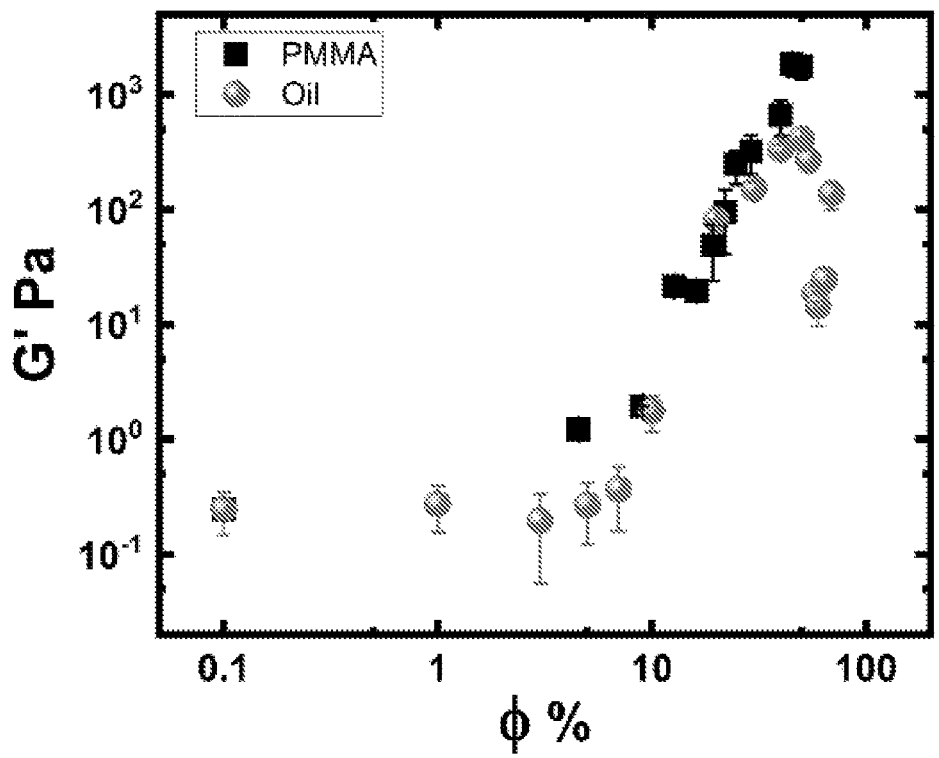
Figure 7B:
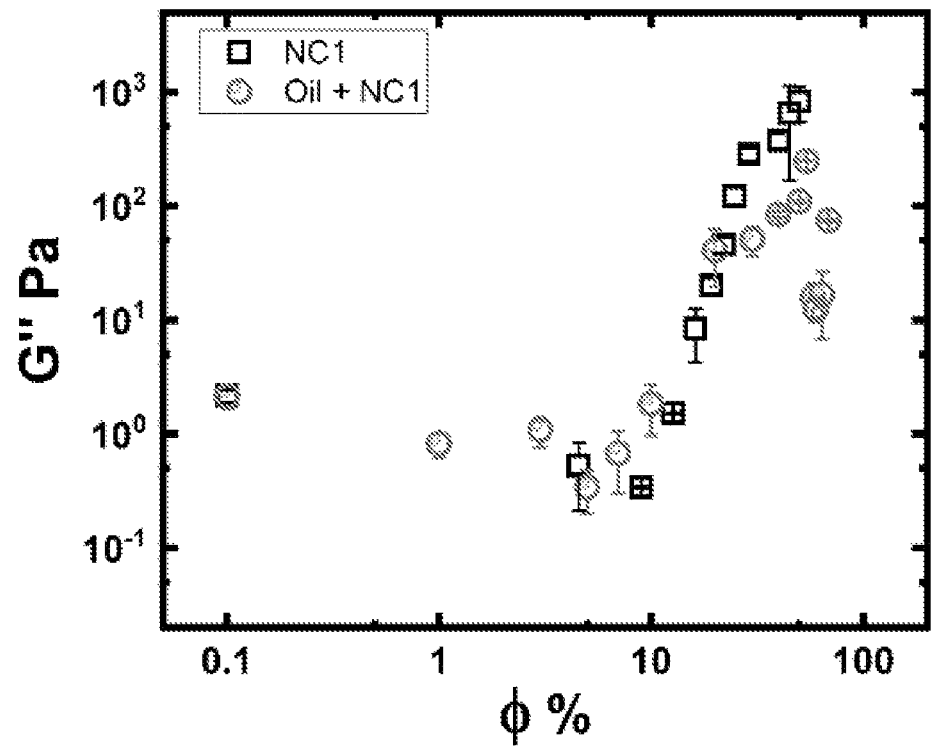

Solid and deformable colloids: Emulsions are liquid colloids. This example compares the PDMS dispersion in NC1 described in Example 2 with the PMMA stabilised by PVP in NC1 of Example 3. The storage modulus (G', see FIG. 7(a)) and loss modulus (G", see FIG. 7(b)) for these two systems were tested as a function of volume fraction of the particles. This shows that in the inventive compositions the strength of the gel increases with the volume fraction of an oil dispersed in the nematic phase. The increase in strength increases until a volume fraction of 45% when some coalescence and phase inversion occurs during oscillatory measurements. The silicone oil used had a viscosity 50 cSt (green) which was dispersed in the lyotropic calamatic nematic phase to an average diameter of 1.4 microns, compared with solid PMMA particles.

Figure 8:
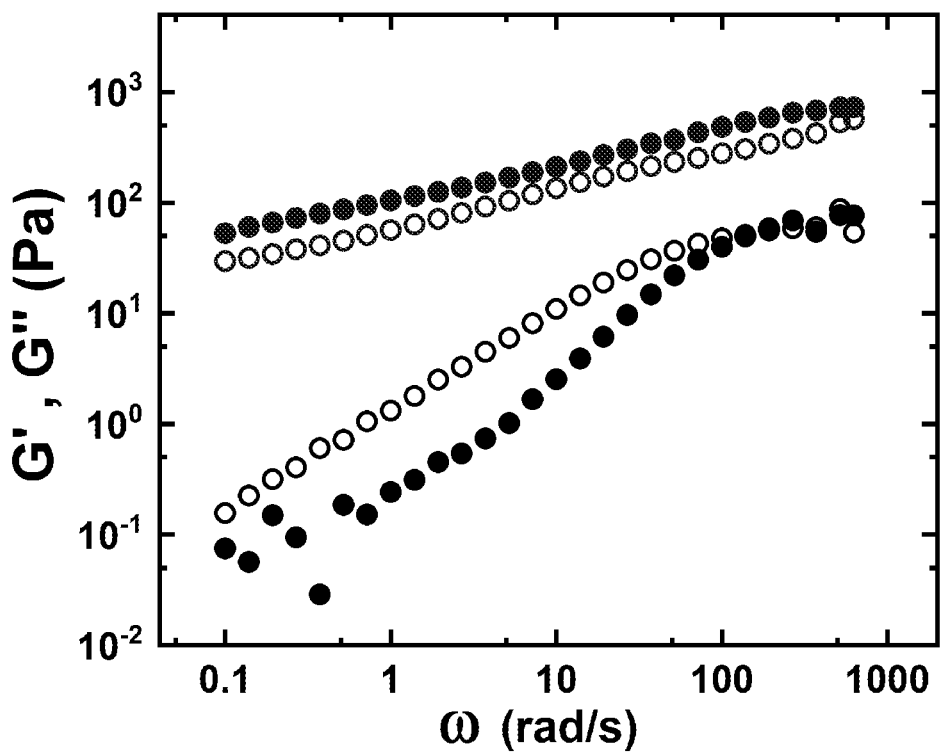

Glassy dynamics: The storage and loss moduli (as measured by oscillatory rheology at a frequency of 1 Hz) of a sample of liquid crystal NC1 comprising a 30% volume fraction of PMMA was compared with NC1 alone. The results are shown in FIG. 8, and demonstrate that with a filled volume fraction of 30% the storage modulus (G') is higher than the loss modulus (G") over three orders of magnitude of the frequency. This implies that the gel is dynamically stable over long periods of time. In FIG. 8, the upper two traces are the PMMA/NC1 sample, and the lower two traces are the NC1 sample. The filled circles are the storage moduli, and the empty circles are the loss moduli.

Figure 9A:
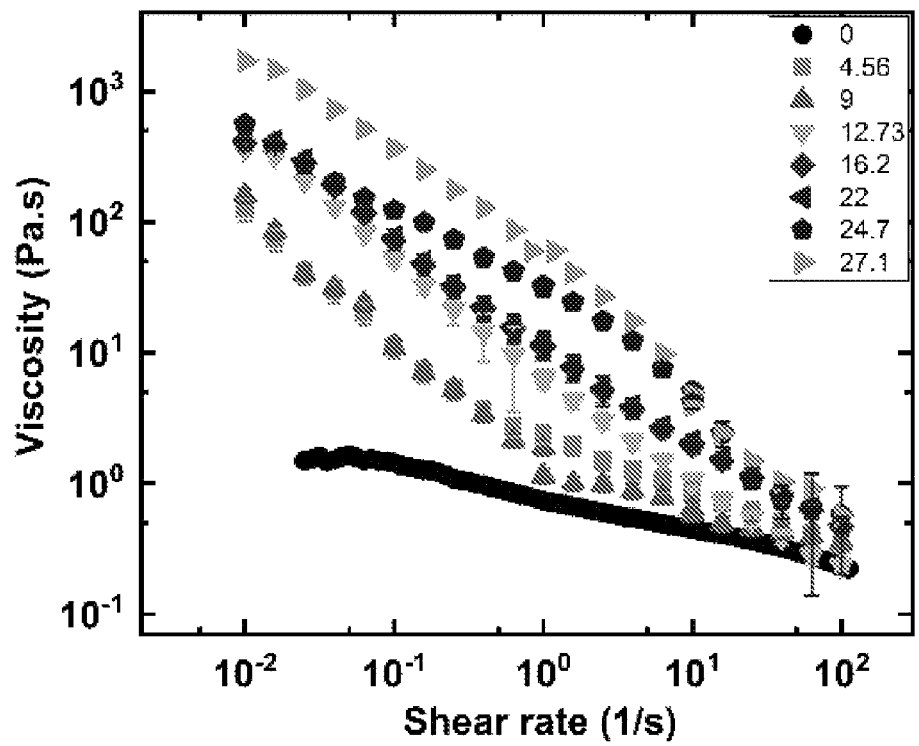
Figure 9B:
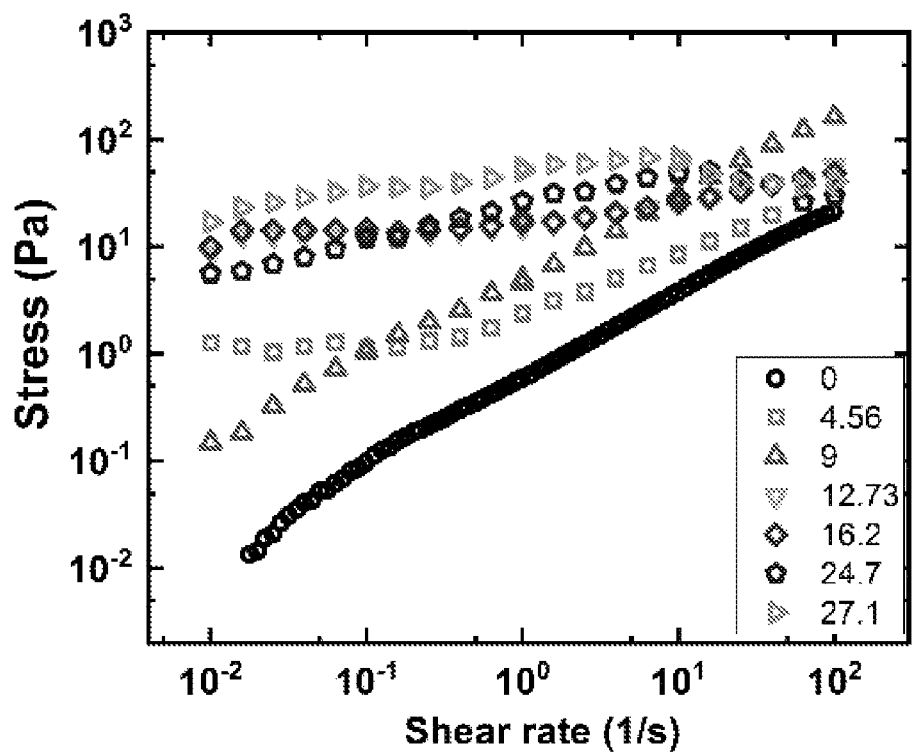

Shear thinning: Shear viscosity in Pas was tested for samples of liquid crystal NC1 comprising 5-50% volume fractions of PMMA. FIG. 9(a) shows a graph of viscosity against shear rate for these samples. FIG. 9(b) shows a graph of stress as a function of shear rate for some of the same samples.

For volume fractions >18%, the shear flow behaviour index n=0.22±0.11 which is very similar to a thermotropic nematic phase.

Example 2A—Industrial Silica

The same protocol was followed to prepare industrial silica, Zeodent 113 in NC1.

Figure 17A:
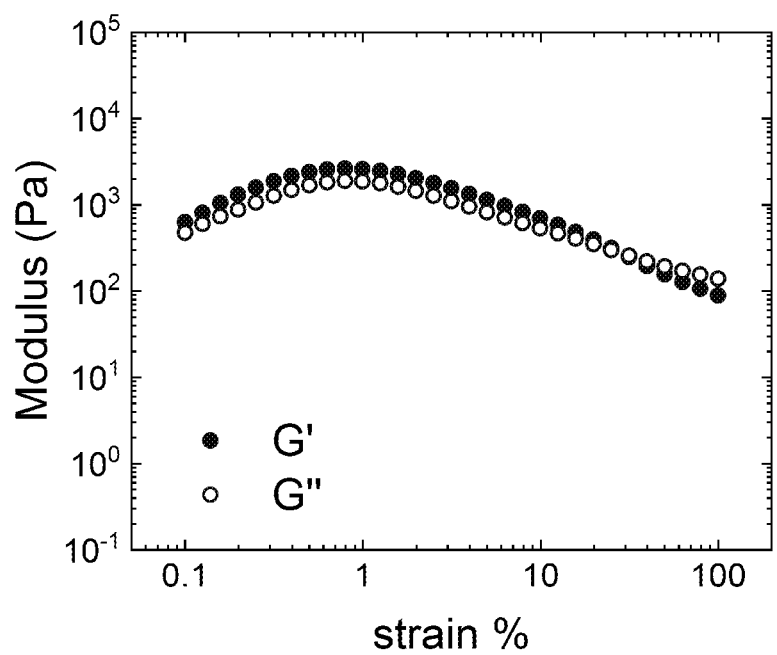
Figure 17B:
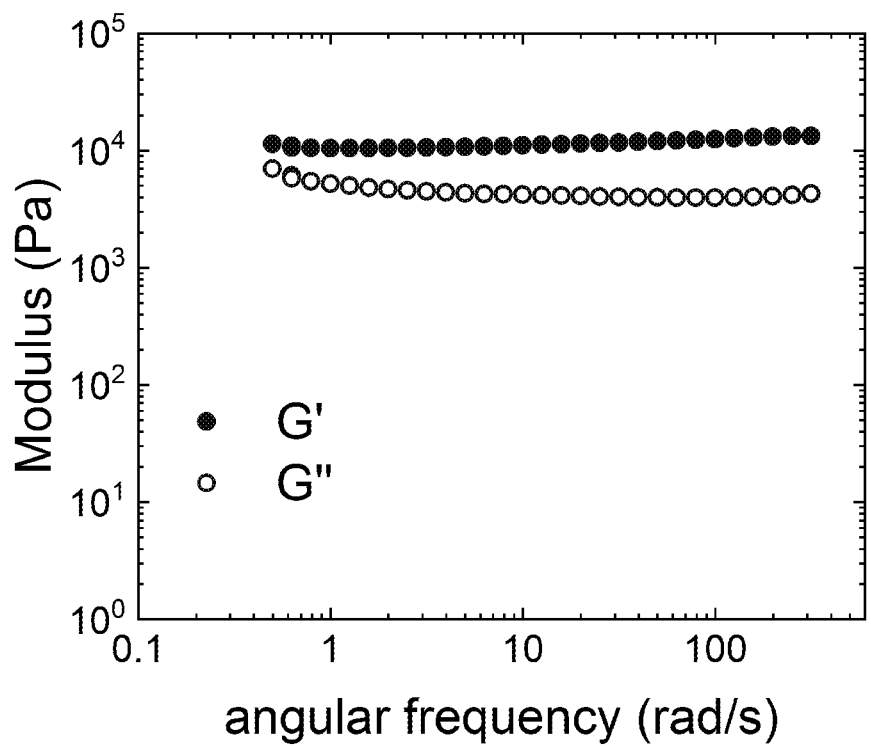

Preparation: A 28.9 wt % dispersion of Zeodent 113 was prepared by dispersing 1.44 g Zeodent 113 in 3.53 g of NC1 solution. Using a density of silica of 1.65 $g/cm^3$ we calculate the volume fraction to be 17.6% and is approximated to φ=0.18 in FIGS. 17(a) and 17(b).

Elevated Storage Modulus: Samples of 28.9 wt % Zeodent 113 in NC1 solution were measured using oscillatory rheology. The storage modulus of the linear viscoelastic regime measured through an oscillatory strain ramp at a frequency of 1 Hz (6.28 rad/s, see FIG. 17(a)). The storage modulus (solid symbols) dominates the loss modulus (open symbols) within the linear viscoelastic regime. The magnitude of the moduli are very close indicating that this volume fraction ($\varphi$=17.6%) is only just within the defect entangled regime.

Glassy dynamics: The same samples were then tested over a range of frequencies at an applied strain of 1% (see FIG. 17(b)). The storage moduli (solid symbols) and loss moduli (open symbols) are fairly constant across the frequencies measured, with the solid modulus higher at all times, indicating that the rheology is glassy.

Example 3—Anisotropic Colloids e.g. Cellulose Nanocrystals

Preparation: Cellulose nanocrystals were bought in powdered form from Celluforce, Canada. To improve the stability of suspensions in water, the colloidal surfaces were modified using TEMPO (i.e. (2,2,6,6-Tetramethylpiperidin-1-yl)oxyl) following instructions in the literature (Y. Habbibi, Cellulose (2006) 13:679-687).

A 10% solution of celluforce was made by dispersing in deionised water, sonicating for 15 minutes and mixing using a high shear mixing. The solution was then allowed to rest overnight. For one preparation, 0.2324 g sodium bromide and 0.0211 g TEMPO were added to 7.3593 g of the 10% Celluforce solution and 0.5990 g sodium hypoflorate was added slowly during stirring of the sample. The pH of the mixture was maintained to 10 at room temperature by adding 0.5 M NaOH while stirring the suspension. After times ranging from 30 to 45 min, the oxidation was terminated by adding methanol (ca. 1 ml) and the pH was adjusted to 7 with 0.5 M HCl. The water insoluble fraction was recovered by centrifugation and washed thoroughly with water. The oxidized cellulose whiskers were dialyzed against distilled water and then maintained as solutions until use. A portion was oven dried at 50° C. for 2 weeks and weighed to measure the mass recovery ratios.

Dispersions were prepared by adding a water based sediment (volume fraction assumed to be 0.64) from a centrifuge containing monodisperse (i.e. polydispersity less than 5%) PMMA particles stabilised by polyvinylpyrrolidone (PVP), prepared in-house, sample ASMM3, to the cellulose solution of the previous paragraph. Drying in the oven was used to reduce the water content until the nematic region was reached. Formation of the nematic phase is determined by a change in the flow properties of the sample and the sample appearing birefringent when the vial is placed between crossed polarisers.

Figure 10A:
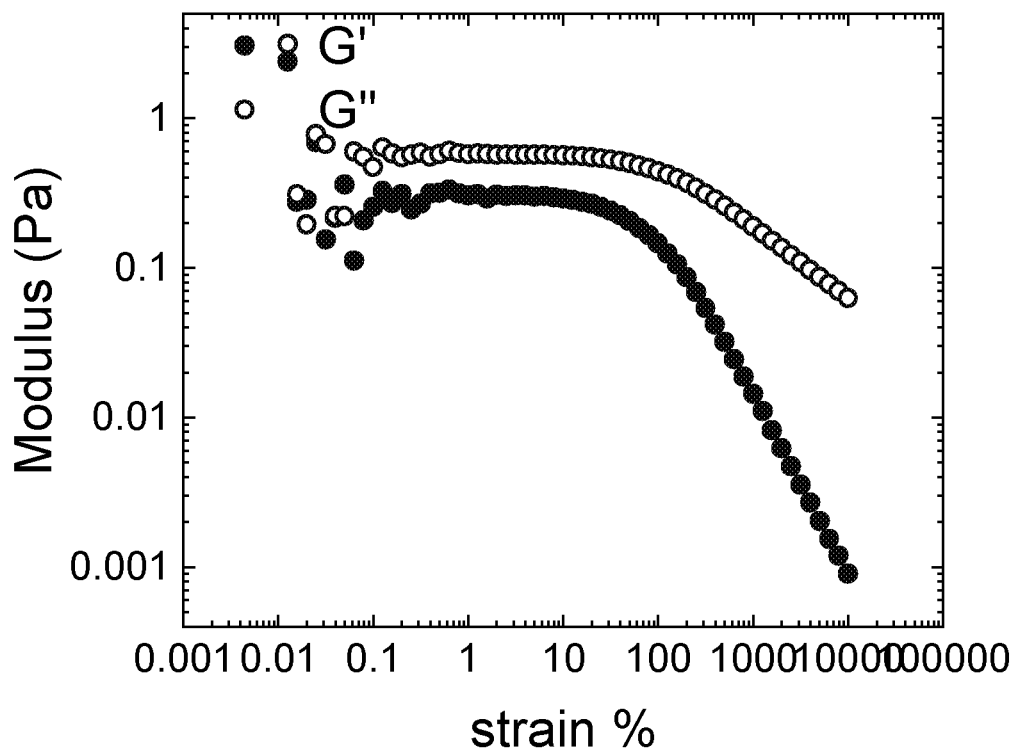
Figure 10B:
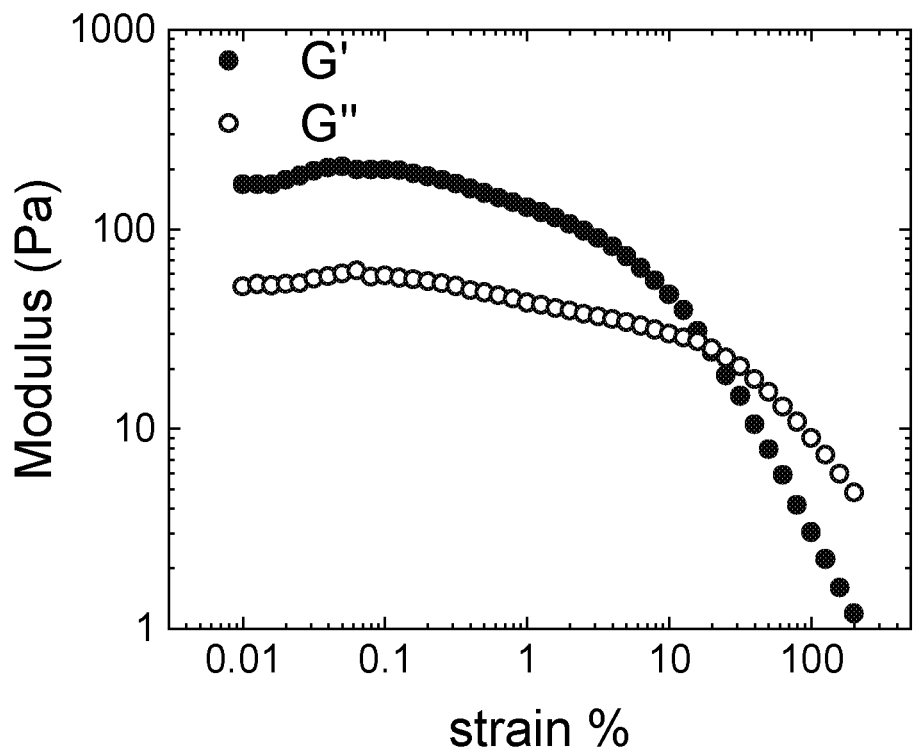

Elevated storage modulus: Samples of 7.4 wt % PMMA-PVP colloids (i.e. a low volume fraction) dispersed in 0.52 wt % TEMPO-modified Celluforce cellulose were tested by oscillatory rheology. The results are shown in FIG. 10(a). Samples of 43.9 wt % PMMA-PVP colloids (i.e. a high volume fraction) dispersed in 0.45 wt % TEMPO-modified Celluforce cellulose were tested by oscillatory rheology. The results are shown in FIG. 10(b). The filled circles are the storage moduli, and the empty circles are the loss moduli. Amplitude sweeps were measured through oscillatory rheology at a frequency of 1 Hz (6.28 rad/s). In agreement with defect stabilised systems, the viscous behaviour dominates at low concentrations (G">G'), below volume fractions of 10%, and the elastic behaviour dominates at high concentrations (G'>G").

Figure 11A:
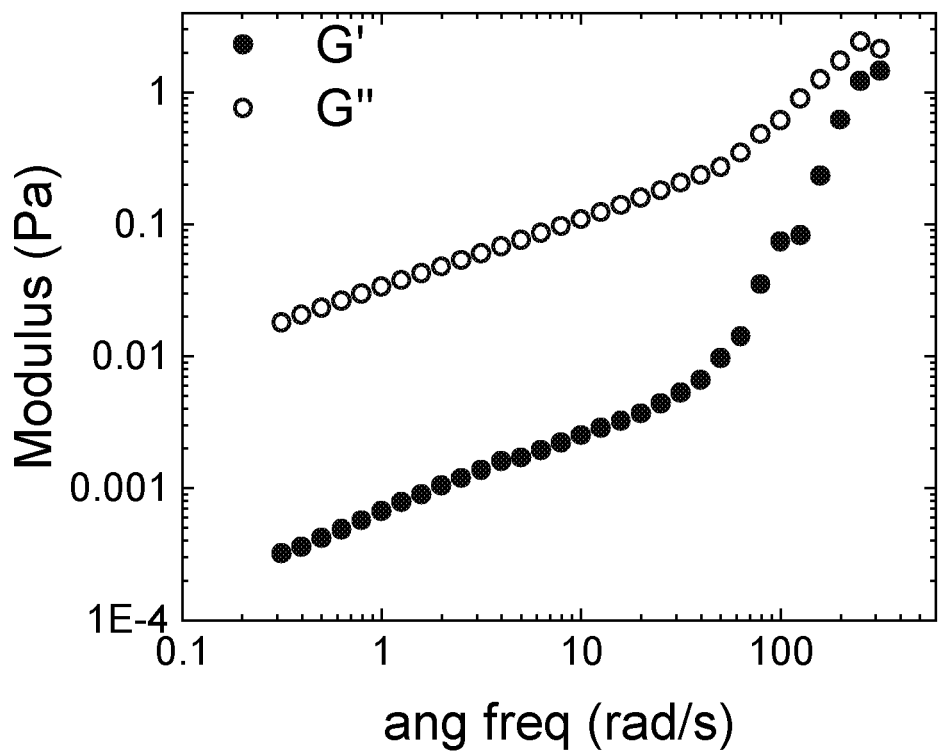
Figure 11B:
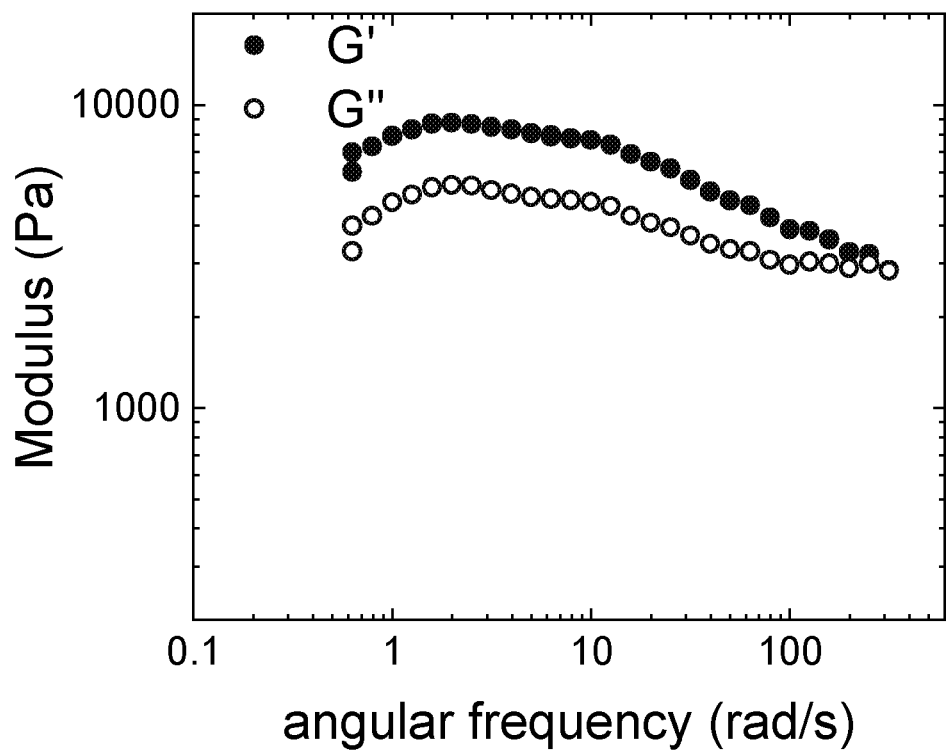

Glassy dynamics: The same samples were then tested by oscillatory rheology to determine storage and loss moduli at a range of angular frequencies. These results are shown in FIG. 11(a) (strain=500%) and FIG. 11(b) (strain=10%). The filled circles are the storage moduli, and the empty circles are the loss moduli. Glassy dynamics at high volume fractions in the nematic cellulose nanocrystal phase are evident since G'>G" to low frequencies. The decrease in both G' and G" indicates that some defect lines may be breaking at higher frequencies although G' still dominates.

In Examples 3A to 3H below, aqueous cellulose nematic solutions were used in the concentration range of 0.55-0.9 wt % cellulose solids in water.

Example 3A—Spheriglass Particles in Cellulose Nematic Solutions in Water

Preparation: A 41 wt % dispersion was prepared by adding 2.9 g of spheriglass 5000, as a dry powder, into 4.1 g of aqueous cellulose nematic solution and stirring vigorously with a spatula. Spheriglass has spherical particles around 10 microns in size. Assuming that the density of the aqueous cellulose nematic solution is equivalent to water (1.0 g/cm$^3$) and the density of spheriglass is 1.65 g/cm$^3$ we calculate the volume fraction $\varphi$~30%. A portion of the samples were sealed with parafilm, allowed to rest for 4 months and remained stable against sedimentation.

Figure 18:
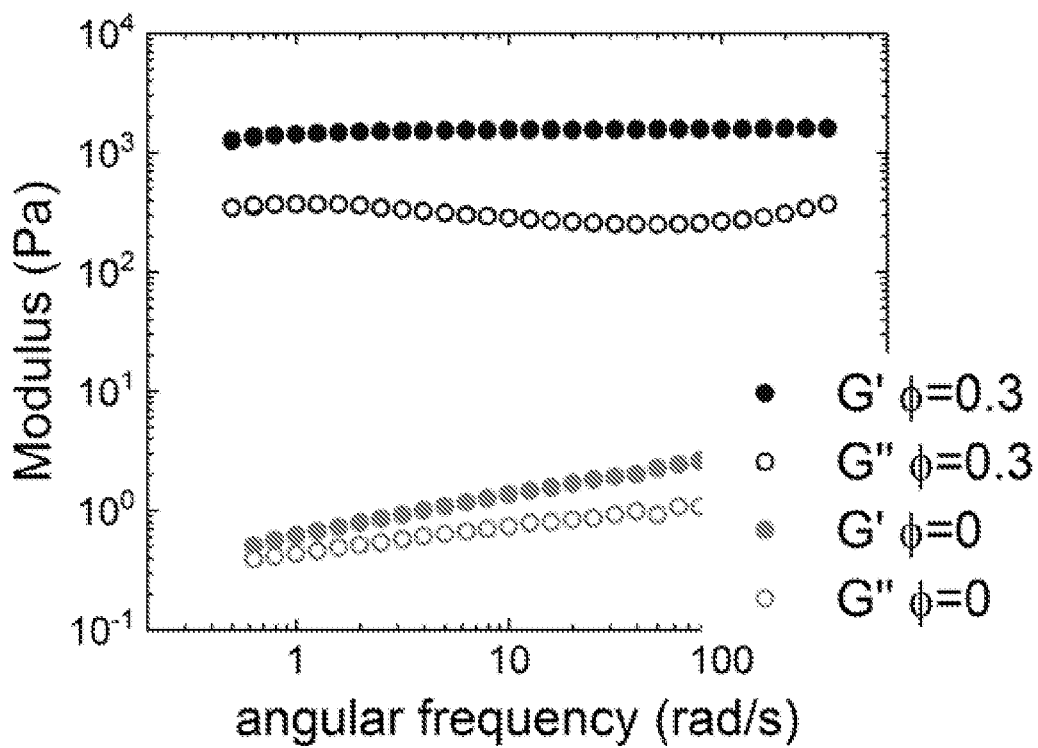

Elevated Storage Modulus and Glassy rheology: Samples were measured using oscillatory rheology. Measurements of the dispersion at $\varphi$~30% was compared with the background rheology (no particles dispersed) of the aqueous cellulose nematic solution. The samples were then tested over a range of frequencies at an applied strain of 1% (see FIG. 18). The storage modulus (solid symbols) dominates the loss modulus (open symbols) at all frequencies exhibiting glass-like behaviour.

Figure 19:
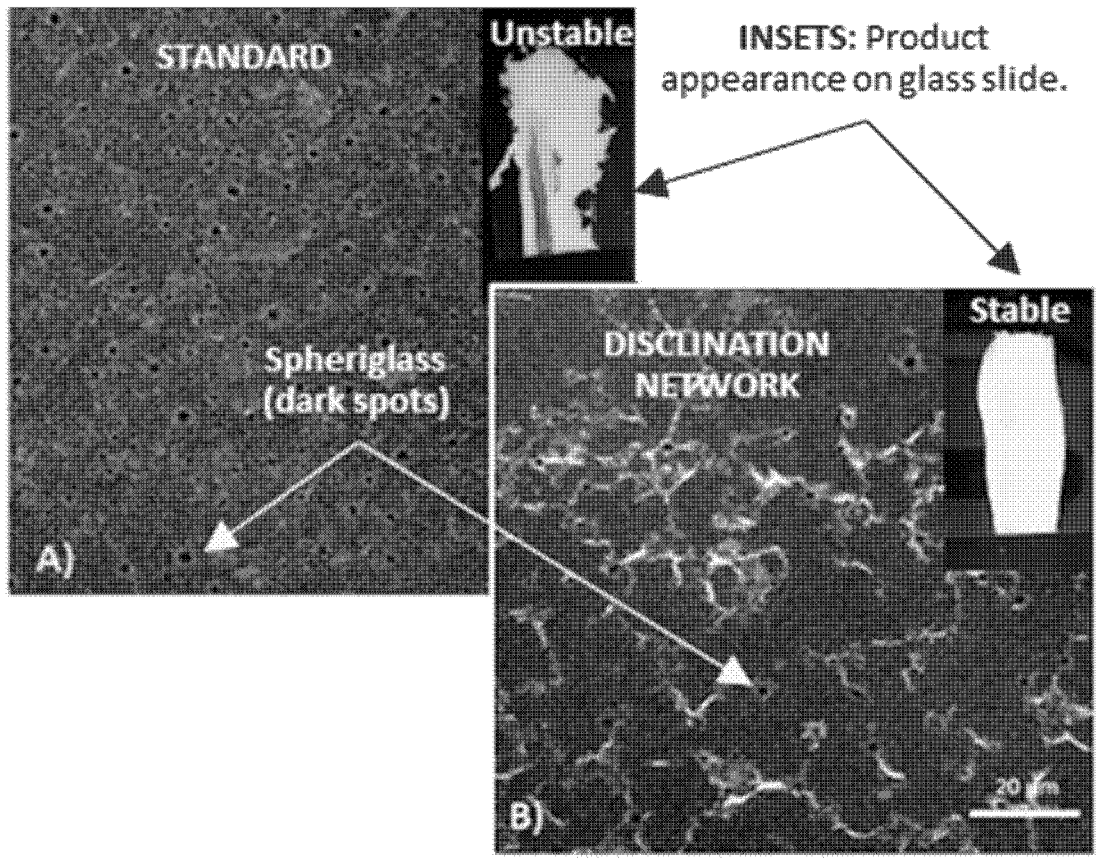

Film stability: Using confocal microscopy (excitation wavelength 488 nm) we compared the macroscopic appearance of a 50 micron film spread onto a glass slide for a 30% dispersions in water and in the cellulose nematic solution (see FIG. 19). Fluorescein dye was added to help visualise the structure under the confocal microscope. The dark spheres show the spheriglass particles and the background appears bright. Bright lines were apparent only in the cellulose nematic solution and are attributed to the concentration of fluorescein within the cores of defect lines spanning the sample. Macroscopically, the film produced for the dispersion in the cellulose nematic solution wetted the glass slide more evenly and dried to form a homogeneous layer, unlike the dispersion in water.

A further dispersion comprising Spheriglass 3000 was also prepared. Spheriglass 3000 consists of particles in the range of 30-50 microns. A dispersion of 58 wt % weight fraction was made by weighing 18 g of spheriglass 3000 into a vial with 13.3 g of aqueous cellulose nematic solution. Assuming that the density of the aqueous cellulose nematic solution is equivalent to water (1.0 g/cm$^3$) and the density of spheriglass is 1.65 g/cm$^3$ we calculate the volume fraction $\varphi$~35%. The sample was sealed with parafilm, allowed to rest for 4 months and remained stable against sedimentation.

Example 3B—Cornflour Particles in Cellulose Nematic Solution in Water

Preparation: A 30 wt % dispersion was prepared by adding 1.7 g of cornflour, as a dry powder, into 3.9 g of aqueous cellulose nematic solution and stirring vigorously with a spatula. Cornflour has near-spherical particles of around 10 microns in size. Assuming that the density of the aqueous cellulose nematic solution and the cornflour is equivalent to water (1.0 g/cm$^3$) we estimate the volume fraction φ~30%. A portion of the samples were sealed with parafilm, allowed to rest for 4 months and remained stable against sedimentation.

Figure 20A:
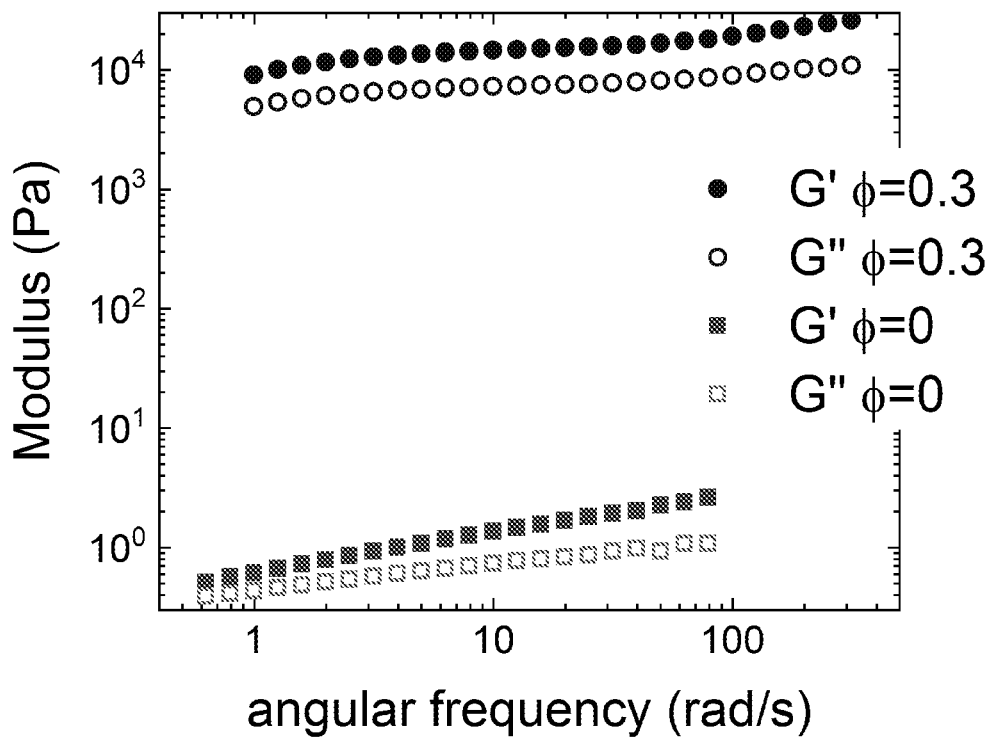

Elevated Storage Modulus and Glassy Rheology: Samples of the dispersion at φ~30% were measured using oscillatory rheology over a range of frequencies at an applied strain of 1% (see FIG. 20(a)). The storage modulus (solid symbols) dominates the loss modulus (open symbols) at all frequencies exhibiting glass-like behaviour. The moduli are over 3 orders of magnitude higher than that for the background cellulose nematic solution.

Figure 20B:
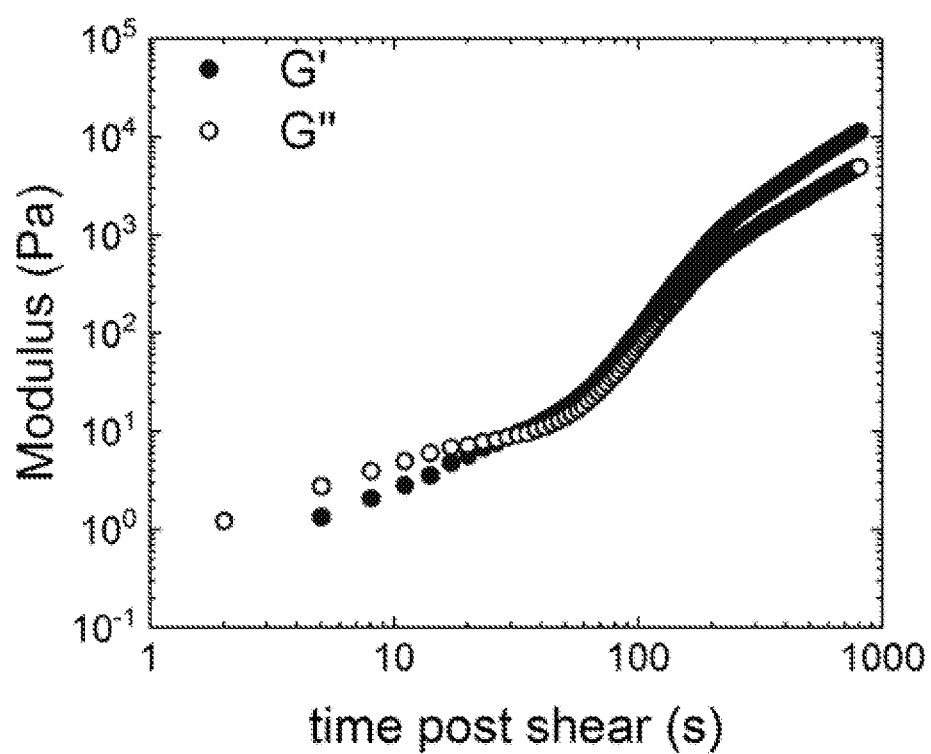

Shear recovery: The same samples were then tested for shear recovery after a preshear of rate 10/s was applied to the sample for 1 minute (see FIG. 20(b)). Immediately afterwards, the storage (G') and loss (G") moduli were recorded using oscillatory rheology, at f=1 Hz and a strain amplitude of Y=1% (see FIG. 20(b)). The elasticity of the sample recovered within a few minutes.

Example 3C—Industrial Calcite Particles in Cellulose Nematic Solutions in Water Preparation: A 54 wt % dispersion was prepared by adding 2.7 g of calcite, as a dry powder, into 2.2 g of aqueous cellulose nematic solution and stirring vigorously with a spatula. Assuming that the density of the aqueous cellulose nematic solution is equivalent to water (1.0 g/cm$^3$) and the density of calcite is 2.7 g/cm$^3$ we estimate the volume fraction φ~21%.

Figure 21:
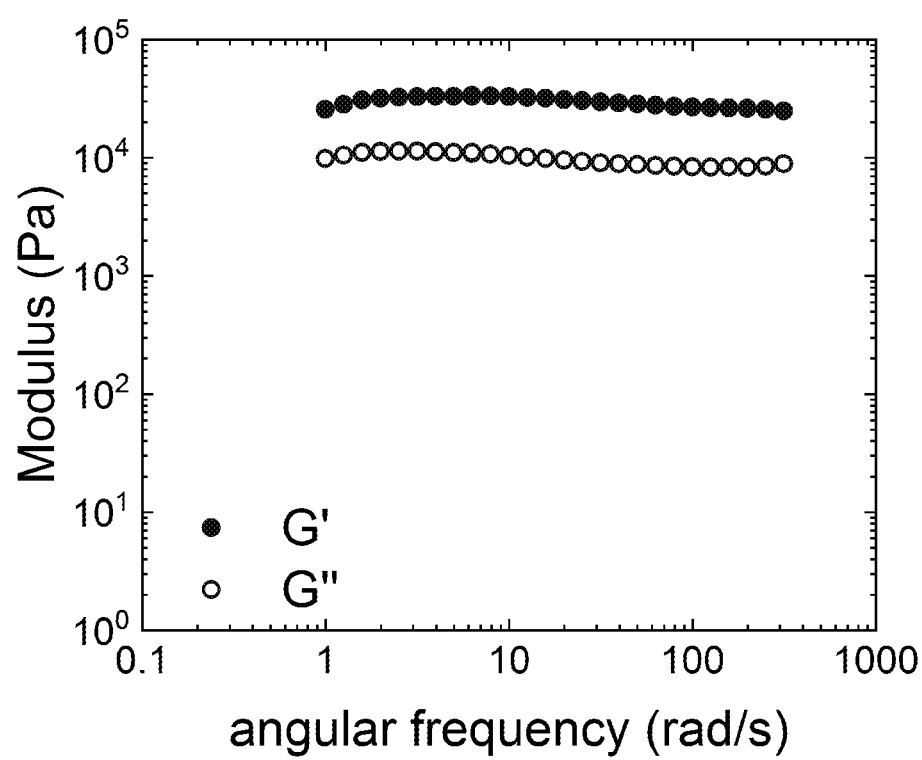
FIG. 21 shows φ~20% calcite dispersion in aqueous cellulose nematic solutions tested using oscillatory rheology over a range of frequencies at an applied strain of 1%.

Elevated Storage Modulus and Glassy Rheology: Samples of the calcite dispersion at φ~20% were measured using oscillatory rheology over a range of frequencies at an applied strain of 1% (see FIG. 21). The storage modulus (solid symbols) dominates the loss modulus (open symbols) at all frequencies exhibiting glass-like behaviour.

Figure 22:
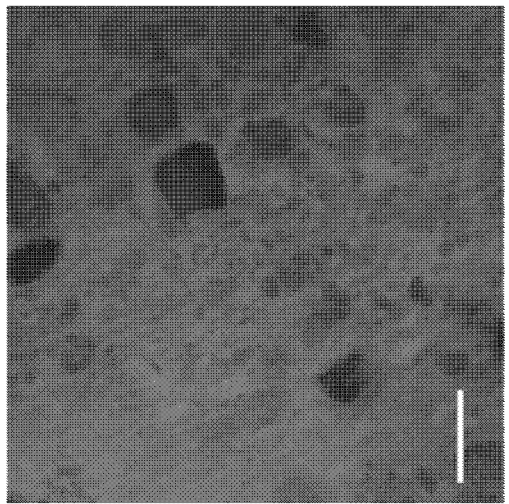
FIG. 22 shows an image of a concentrated dispersion of Spheriglass 5000 (left), Zeodent 113 (middle) and Zeodent 153 (right) in water dyed with fluorescein and imaged using confocal microscopy with a 63× magnification oil immersion objective.
Figure 22:
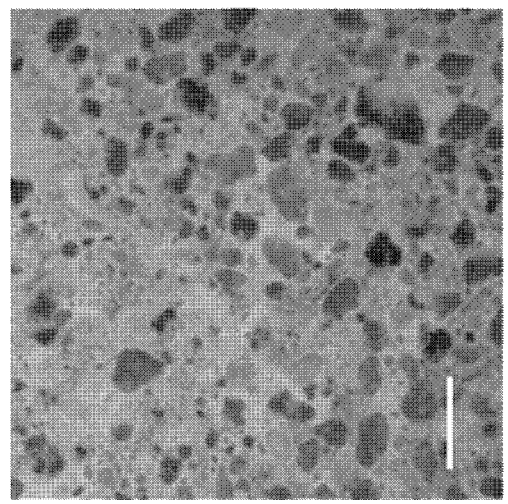
Figure 22:
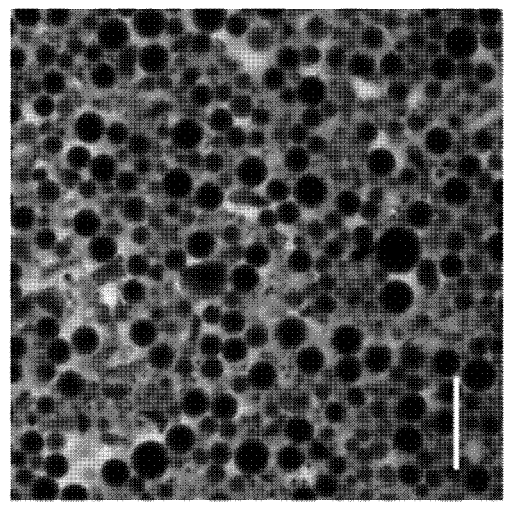

Example 3D—Industrial Silica Particles in Cellulose Nematic Solutions in Water Industrial silica, such as zeodent is non-spherical. Images of dispersions of spheriglass 5000 were compared with Zeodent 113 and Zeodent 153 (see FIG. 22). While the particles are all of the order of 10 microns in size, the industrial Zoedent particles are much more irregular in shape.

Preparation (i): A 40.6 wt % dispersion of Zeodent 153 was prepared by dispersing 2.02 g of dry Zeodent 153 powder in 2.94 g of aqueous cellulose nematic solution. Using a density of silica of 1.65 g/cm$^3$ we calculate the volume fraction to be 24.6%.

Preparation (ii): A 42.2 wt % dispersion of Zeodent 113 was prepared by dispersing 1.67 g Zeodent 113 in 2.27 g of aqueous cellulose nematic solution. Using a density of silica of 1.65 g/cm$^3$ we calculate the volume fraction to be 25.6%.

Figure 23B:
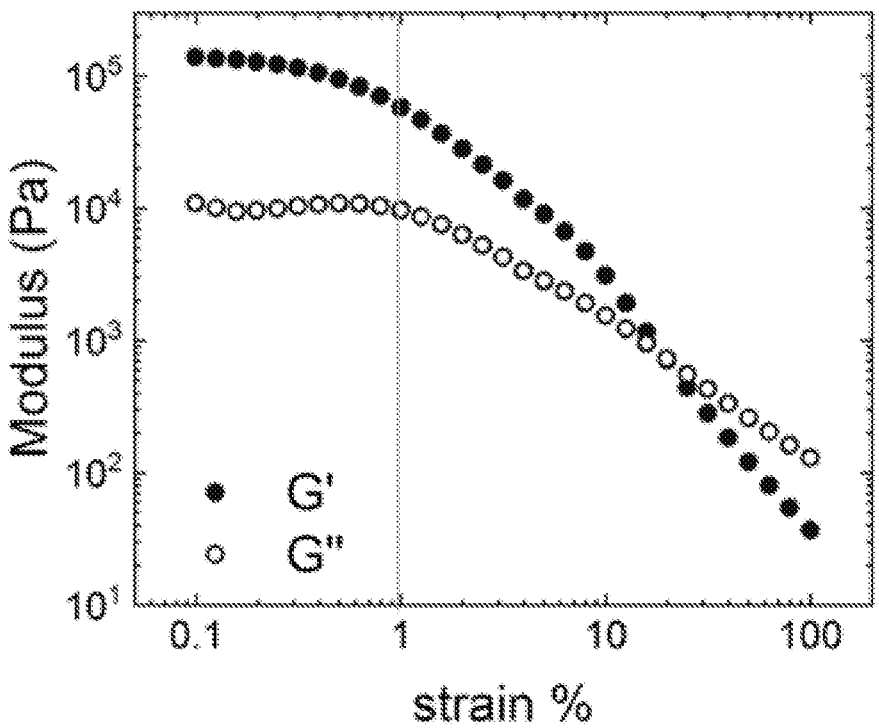

Elevated Storage Modulus: Both samples were measured using oscillatory rheology. The storage modulus of the linear viscoelastic regime measured through an oscillatory strain ramp at a frequency of 1 Hz (6.28 rad/s, see FIGS. 23(a) and 23(b)). The storage modulus (solid symbols) dominates the loss modulus (open symbols) within the linear viscoelastic regime. Both samples yield at a strain above 1%.

Glassy dynamics: The same samples were then tested over a range of frequencies at an applied strain of 1% (see FIG. 24). The storage modulus (solid symbols) dominates the loss modulus (open symbols) at all frequencies exhibiting glass-like behaviour. The behaviour appears independent of the colloid.

Shear thinning: The same samples were investigated through flow rheology and the viscosity and shear stress were measured at a range of applied shear rates from 0.01 to 10 s$^{-1}$ (see FIG. 25). The gradient shows the exponent of the viscosity is ~−0.95 (n=0.05) indicating this composite is highly shear-thinning.

Example 3E—Sunflower Oil Emulsion in Aqueous Cellulose Nematic Solution

Preparation: A 29 wt % emulsion of sunflower oil was prepared by weighing 1.4 g of sunflower oil into a vial with 3.5 g of aqueous cellulose nematic solution. 0.001 g of Nile Red and 0.001 g of fluorescein were added. No surfactant was added. The mixture was emulsified using a hand-held Silverson shear mixer. Using a density of sunflower oil of 0.93 g/cm$^3$ we calculate the volume fraction to be ~30%.

The emulsion was smeared onto a glass slide, at a thickness of 50 microns, and allowed to dry. The emulsion appeared homogeneous with droplets of 10-30 microns remaining separated within the dried film (see FIG. 26). Bright lines associated with the fluorescein signal reveal the defect lines that extend throughout the structure, providing stability.

Example 3F—Cellulose Nematic Solutions in Glycerol

Preparation: To prepare cellulose nematic solutions in 100% glycerol, 10 mL of aqueous cellulose nematic solution was added to 9 mL of glycerol and mixed using a roller bank for one hour. The dispersion was then dried under vacuum for 1 week at 60° C. Viewing the dispersion between crossed polarisers revealed that dispersion was in the nematic phase.

Example 3G—Industrial Silica Particles in Cellulose Nematic Solutions in Glycerol Preparation: A 33 wt % dispersion was prepared by adding 2.24 g of Zeodent 113, as a dry powder, into 4.56 g of cellulose nematic glycerol solution and was stirred vigorously with a spatula. Zeodent 113 has irregularly shaped particles around 10 microns in size. Assuming that the density of the cellulose nematic glycerol solution is equivalent to glycerol (1.26 g/cm$^3$) and the density of silica is 1.65 g/cm$^3$ we calculate the volume fraction φ~27%. Samples were allowed to rest for 4 months and remained stable against sedimentation.

Elevated Storage Modulus: Samples of 33 wt % of Zeodent 113 in cellulose nematic glycerol solution were measured using oscillatory rheology. The storage modulus of the linear viscoelastic regime measured through an oscillatory strain ramp at a frequency of 1 Hz (6.28 rad/s, see FIG. 27(a)). The storage modulus (solid symbols) dominates the loss modulus (open symbols) within the linear viscoelastic regime.

Figure 27B:
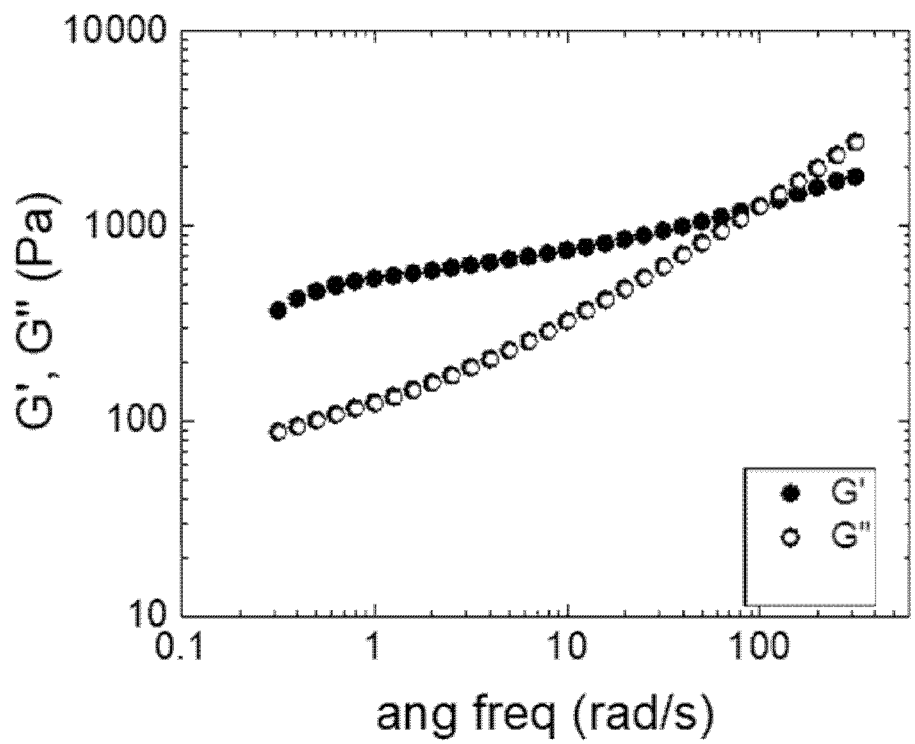

Glassy dynamics: The same samples were then tested over a range of frequencies at an applied strain of 0.5% (see FIG. 27(b). The storage modulus (solid symbols) dominates the loss modulus (open symbols) at all frequencies exhibiting glass-like behaviour.

Shear recovery: The same samples were then tested for shear recovery after a preshear of rate 10/s was applied to the sample for 1 minute. Immediately afterwards, the storage (G') and loss (G") moduli were recorded using oscillatory rheology, at f=1 Hz and a strain amplitude of Y=0.5% (see FIG. 28(a)). The elasticity of the sample recovered within 1 minute.

Figure 28B:
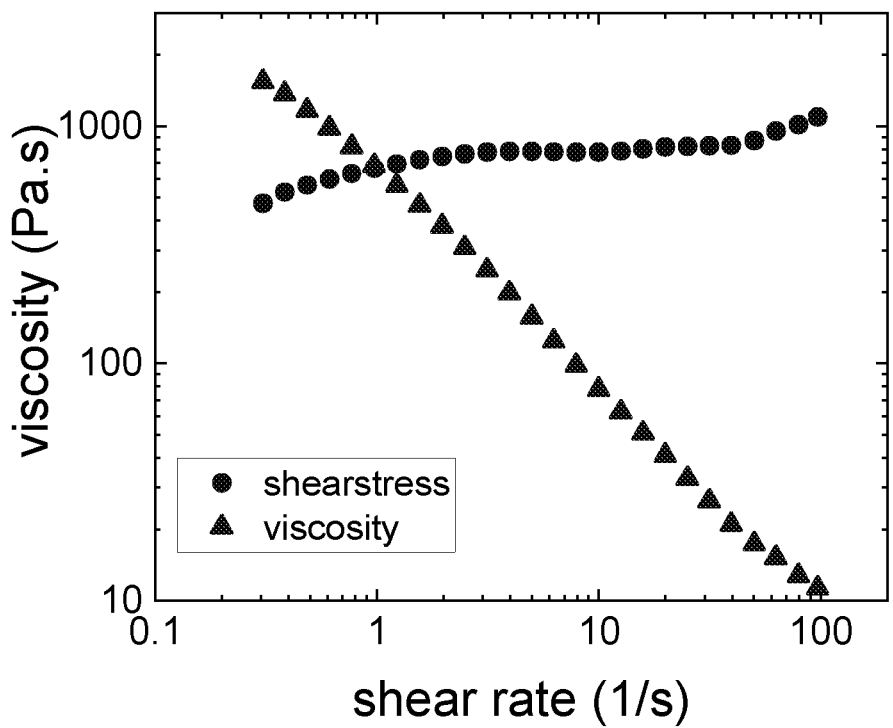

Shear thinning: The same samples were investigated through flow rheology and the viscosity and shear stress were measured at a range of applied shear rates from 0.5 to 100 s$^{-1}$ (see FIG. 28(b)). The gradient shows the exponent of the viscosity is ~−0.95 (n=0.05) indicating this composite is highly shear-thinning.

Temperature dependence: The same samples were investigated over a range of temperature using oscillatory rheology. Tan delta=G"/G' was measured using oscillatory rheology, at f=1 Hz and a strain amplitude of Y=1%, for a 33 wt % dispersion of Zeodent 113 in cellulose nematic glycerol solution for a range of temperatures between 20 to 60° C. (see FIG. 29). The form of tan delta remains independent of temperature while the absolute values of tan delta increases with temperature. This implies that the stability of the composite would increase with an increase of temperature. This behaviour is converse to that seem with polymer solutions where tan delta usually increases, or changes form, with temperature.

Example 3H—Titania Particles in Cellulose Nematic Solution in Glycerol

A 53 wt % dispersion of titania (average size unknown) was prepared by dispersing 4.83 g of titanium dioxide powder, used as received, in 4.27 g of cellulose nematic solution in glycerol. The dispersion was mixed thoroughly using a spatula. Assuming that the density of the cellulose nematic glycerol solution is equivalent to glycerol (1.26 g/cm$^3$) and the density of titania is 4.23/cm$^3$ we calculate the volume fraction φ~25%. Samples were allowed to rest for 4 months and remained stable against sedimentation.

Example 4—Thermotropic Data

Preparation: Poly(methyl)methacrylate (PMMA) particles were provided by Andrew Schofield. The particles are sterically stabilized against flocculation by poly(12-hydroxystearic acid) (PHSA).

The PMMA colloids were dried thoroughly by leaving them in an oven overnight at 75° C. The resulting powder was weighed out and the appropriate quantity of the thermotropic nematic phase was added, used as received by the supplier. The PMMA-PHSA was dispersed in the thermotropic liquid crystal using a combination of 30 minutes of sonication, 1 minute of vortex mixing and by stirring with a spatula. This process was repeated if necessary until the suspension has a smooth texture. If colloids are strongly aggregated it can be necessary to heat the mixture to the isotropic phase while using ultrasound. It is then necessary to shear again after cooling to the nematic phase to ensure that no structure is retained from the cooling process and the structure of the composite is determined by the nematic phase.

Figure 12:
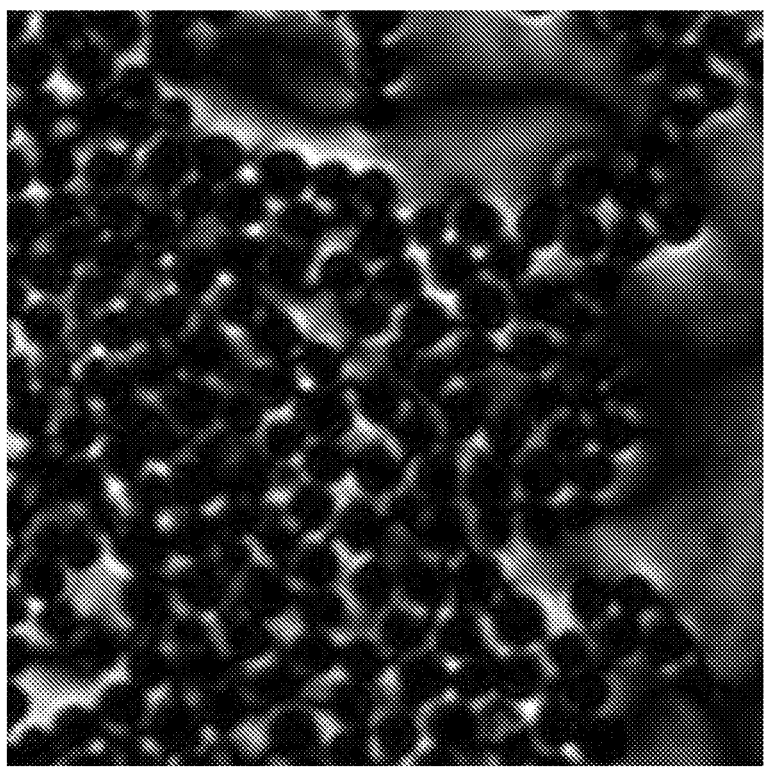

Variants tested include nematic materials 5CB, E44 and MLC2089 as the thermotropic nematic phase and particles made of Stober silica and PMMA particles stabilised with polylaurylmethacrylate (PLMA). Particle radii from 133 nm-2 microns were studied. To give a specific example, PMMA-PHSA colloids of 1 micron diameter were mixed into 5CB at a concentration of 30% by volume. FIG. 12 shows a micrograph of this material sandwiched to a single layer between crossed polarisers. Defect lines connecting colloids can be seen clearly.

Figure 13:
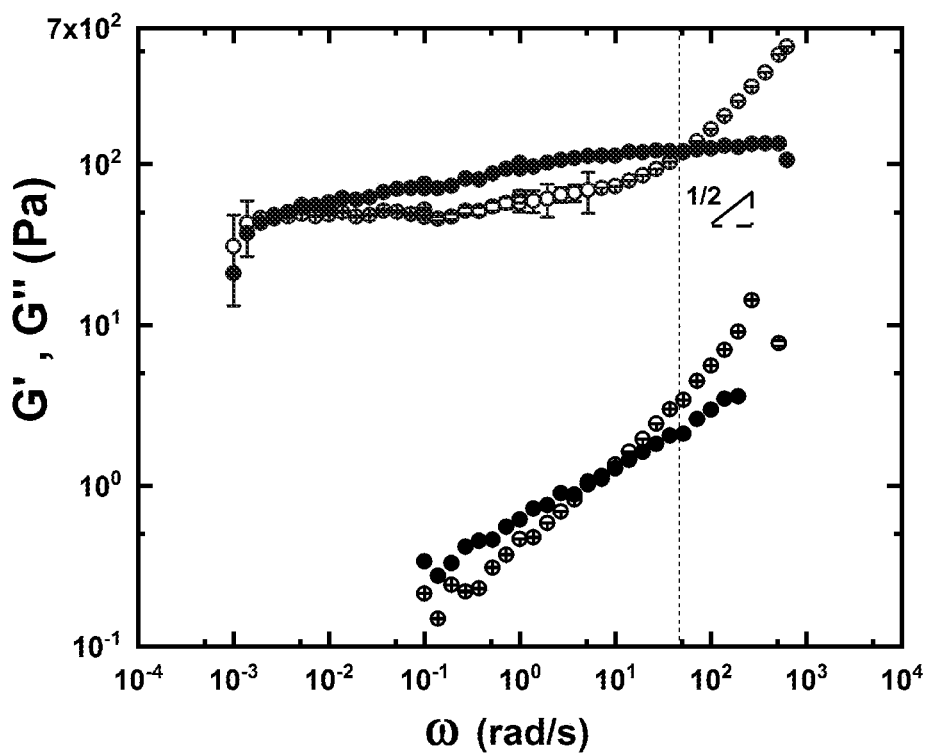

Glassy dynamics: Samples of 30% and 5% volume fraction PMMA-PHSA in 5CB were tested by oscillatory rheology to determine storage and loss moduli at a range of angular frequencies. These results are shown in FIG. 13. The filled circles are the storage moduli, and the empty circles are the loss moduli. The uppermost paid of traces relate to the 30% material, and the lower two to the 5% material.

A further way to explore glassy dynamics is by looking at the frequency dependence of tan δ=G"/G'. At low frequencies, and low strains, tan δ<1 and decreases with increasing frequency indicating glassy dynamics. There is a minimum tan δ after which tan δ increases steeply as the flow (viscous) behaviour dominates over the elastic behaviour. The frequency of yielding is inversely proportional to the strain applied indicating that the yielding behaviour is determined by the Ericksen number (defined above). This is important to know since the strain rate (strain*frequency) at which yielding occurs will depend on the Frank elastic constant of the nematic medium.

Figure 14A:
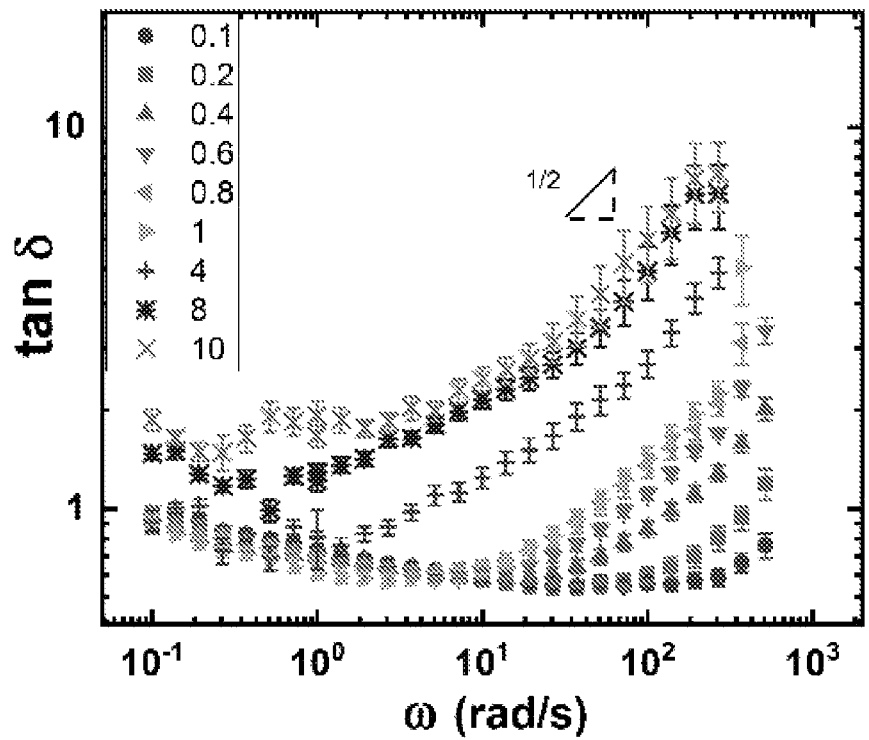
Figure 14B:
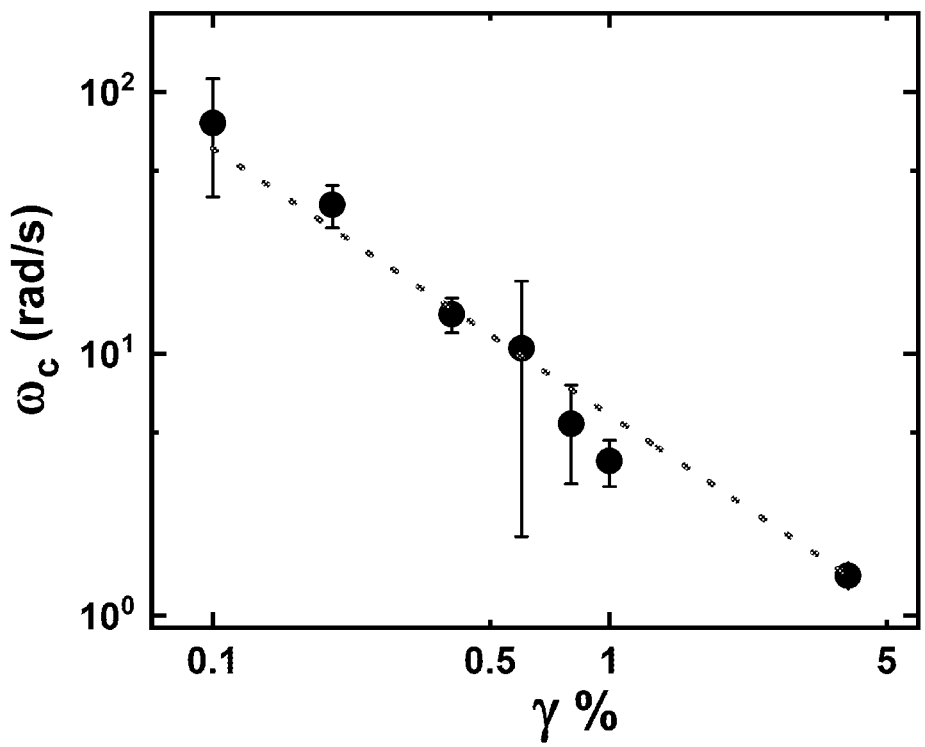

FIG. 14(a) shows Tan δ=G"/G' as a function of angular frequency for a range of strains applied to a suspension of PMMA-PHSA in 5CB, volume fraction 30%. FIG. 14(b) then shows the crossover when tan δ=1 is plotted as a function of strain.

Shear thinning: Pure 5CB LCs and dilute composites (PMMA-PHSA), volume fraction ~5%, were tested and showed mild shear thinning behaviour with a slope of n=0.79. Concentrated filled composites (PMMA-PHSA), of volume fractions >20%, were also tested and showed strong shear thinning behaviour with a rate of 0.27±0.11.

Figure 15A:
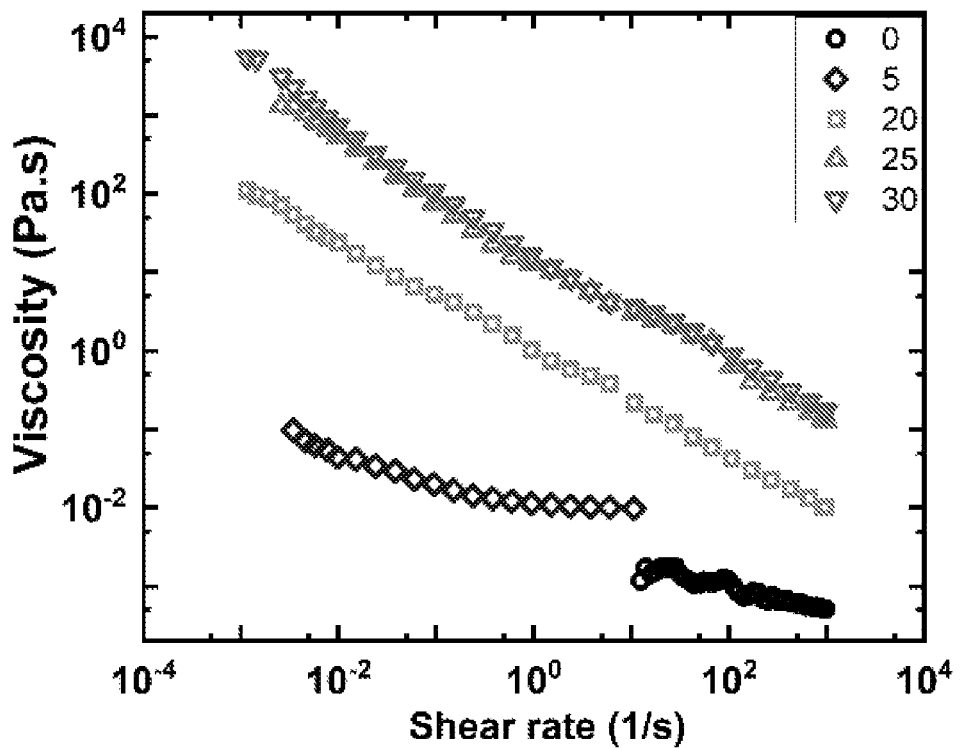
Figure 15B:
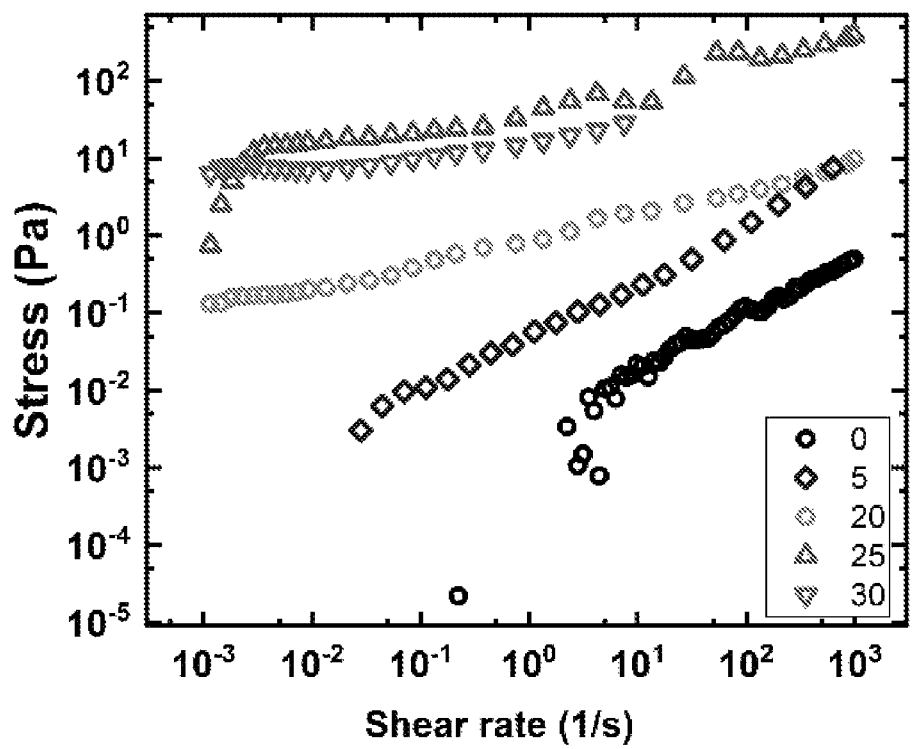

FIG. 15(a) shows a graph of shear viscosity Pas of PMMA-PHSA in 5CB plotted against shear rate, for various volume fractions from 5% to 50%. FIG. 15(b) is a graph of stress as a function of shear rate for the same PMMA-PHSA composites.

Figure 16A:
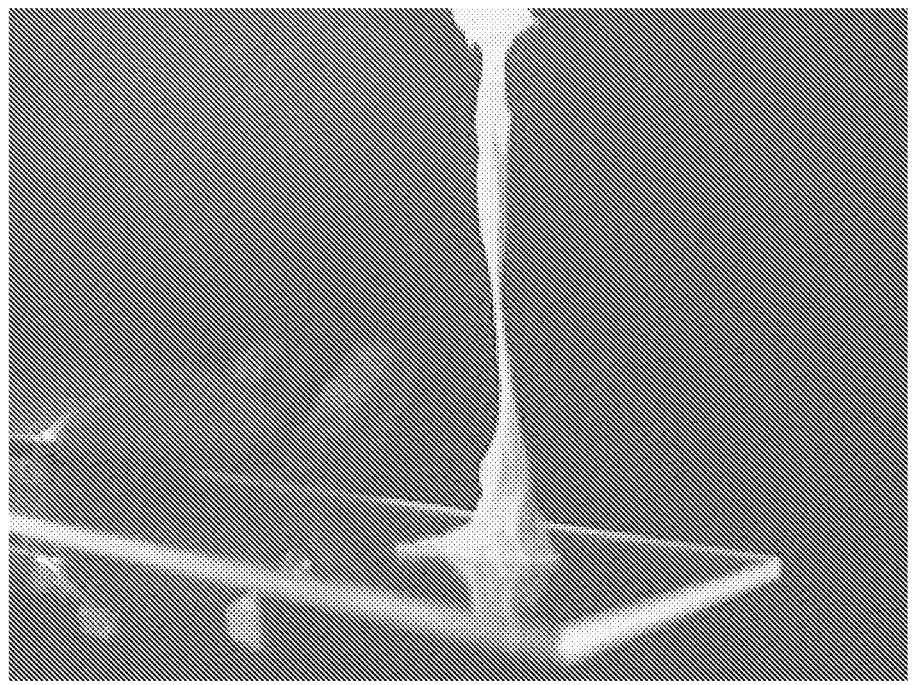
Figure 16B:
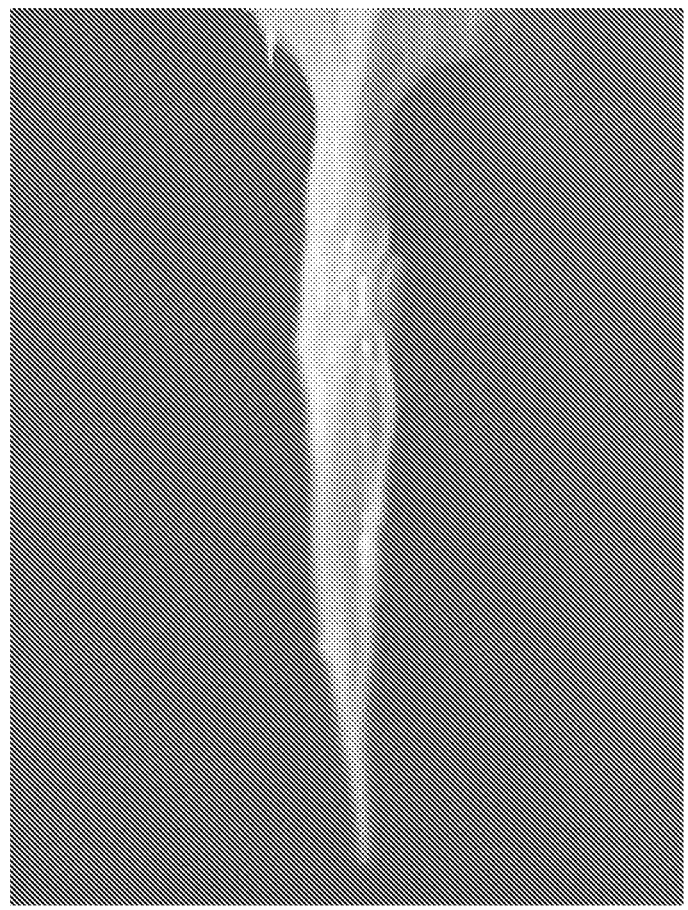

FIGS. 16(a) and (b) shows photographs of a 49% volume fraction of PMMA-PHSA colloids in 5CB. At a volume fraction of 49% of colloids the material is highly stretchy and the glassy dynamics arrest the deformed structure. This type of composite is suitable for yarn or film creation.

Further discussion of the invention is set out below.

This is a platform technology in which disclinations (defect lines) are generated by colloidal inclusions to span a lyotropic nematic (or chiral nematic) liquid crystal to form a gel. Its applications for formulations and composites useable across sectors are described. It has several technical advantages:

A. The gels have a high storage modulus tuned from 1 to 10$^5$ Pa through the number of disclinations spanning a nematic liquid crystal either through colloidal dispersion at volume fractions >10% and are therefore model yield stress fluids.

B. The gels exhibit glassy dynamics when cessant, thus can maintain the long term stability of dispersions with even texture with the potential to prevent phase separation, sedimentation or creaming for over 10 years (as exemplified by a thermotropic nematic).

C. The gels are exceptionally shear-thinning. By convention, the viscosity of a shear thinning fluid is described by $\eta = \dot{\gamma}^{(n-1)}$ where $\dot{\gamma}$ is the shear rate and (n−1) is the exponent. For the gels of the invention, n can be in the range 0<n<0.25. For emulsions n−0.5 and for polymer solutions 0.33<n<0.5. Therefore, the gels provide superior sensory performance and lubrication and in combination with Claim A are ideal for drilling fluid, inks and paints.

D. The can be destroyed by shear or electric or magnetic field and then self-heals. The disclinations regenerate at low, or zero strains, allowing the modulus of the gel to recover. In polymer gels cross-links are often unable to re-form.

E. Gels created through colloid dispersion are extensible at high volume fractions of ~35-45%, thus suitable, for example, for yarn creation. (FIG. 10)

F. Space-spanning disclinations can be used to self-assemble nanoparticles and large molecules into string-like structures spanning a composite to avoid non-percolating structures due to phase separation (coalescence or spinodal decomposition). Space-spanning disclination allow diffusion and transport of small molecules from one surface to another since they can be carried at a fast rate through the disclination core (close to the rate in the isotropic phase) when compared to the nematic background.

The Design Principles

Principle 1: Colloids must be dispersed within a nematic phase. The nematic material may have some chirality, as long as the pitch of the chiral nematic phase p>2r where r is the colloid radius. The term 'nematic' is considered to include 'chiral-nematic' materials as used herein.

Principle 2: It is necessary for the nematic director to be anchored homeotropically to the colloid surface.

Principle 3: The anchoring of nematogens should be sufficiently weak so that a Saturn-ring defect arises which encircles the colloid. This occurs when Wr<K where W is the anchoring strength, r is the colloid radius and K is the generalised Frank elastic constant of the nematic phase.

Principle 4: Colloids must be dispersed at volume fractions greater than 15%, the Saturn-ring defects entangle so that defect lines extend across the sample.

Features

Feature 1: The storage modulus, G', is a measure of the solid-like response of the material and is given by $G'=T/\pi a^2$ where T is the line tension of a disclination (usually around 100 pN) and a is the average distance between disclinations. Typically, a nematic film with a=1 micron reaches $G'=10^3$ Pa, where G' is the storage modulus or a soft material and is the elastic contribution to the complex modulus.

Feature 2: When disclinations are nucleated by a dispersed phase, a is limited by the a=1.1d which is the separation for entangled Saturn ring disclinations between neighbouring colloids where d=2r is the colloid diameter. There is a high energy barrier for colloids to approach closer so the colloids remain separated and this prevents coalescence. It also creates a maximum packing fraction for the defect stabilised gel which is around 55%, above this the colloids are forced together and colloid-colloid interactions dominate.

Feature 3: When shear is exerted, competition between the flow behaviour and elastic energy of the nematic is described by the Ericssen number $$E_r = \frac{\alpha \dot{\gamma} a^2}{K}$$

where $\dot{\gamma}$ is the shear rate exerted on the material. The elastic properties of the confined nematic regions prevent flow at low shear rates. Flow dominates when the Ericksen is greater than 1. For small amplitude oscillatory shear, the critical frequency above which flow behaviour dominates (elastic behaviour dominating for low shear rates) rises as the average separation between disclinations decreases since $$\omega_c > \frac{2\pi K}{\mu \gamma a^2}.$$

Thus elasticity dominates to higher frequencies (or shear rates) when the number of disclinations percolating across the sample increases. When the disclinations are separated by distances <50 microns, the rheology becomes increasingly glassy and elastic.

Feature 4: Disclinations are close to isotropic within their core and this allows for enhanced diffusion or transport through the corridors of the disclination because they have a lower viscosity than the surrounding nematic. Disclinations are also known for attracting nanoparticles or large molecules since the elastic continuum of the nematic expels additives that distort the director. These features lend the defect-stabilised gel to applications requiring the structuring and/or transport of nanoparticles or large molecules. The bright appearance of defect lines shown in FIGS. 19 and 26 demonstrates the accumulation of small molecules (in this case fluorescein) within defect lines.

Lyotropic Nematic Phases

There are many types of lyotropic phases and all are formed from highly anisotropic entities that self-assemble at relatively high concentrations to form a nematic phase that has orientational order, the average direction defining the director, and no, or very long range, positional order. The exact concentration at which the nematic phase occurs depends on the specific phase diagram for that system.

Data is included for three different types of lyotropic nematic mesophases that all exemplify the same behaviour when the same 'design principles' are followed. Examples include lyotropic phases made from:

1. Anisotropic molecules, e.g. chromonic lyotropic phases
    chromonic lyotropic liquid crystals composed of disc shaped molecules that are soluble in a solvent stacking with a director parallel to the short axis of the molecules
    long fairly-rigid polymer molecules, possibly of biological origin, e.g. polysaccharides, glycolipids, DNA and actin.
2. Anisotropic micelles, e.g. surfactants and co-surfactants in a solvent.
    lipid mixtures e.g. dimyristoylphosphatidylcholine (DMPC) with either dihexanoylphosphatidylcholine (DHPC) or the bile-salt derivative, 3-(cholamidopropyl)dimethylammonio-2-hydroxy-1-propanesulfonate (CHAPSO)
    fatty alcohol and surfactant e.g. sodium dodecyl sulphate and decanol in water (exemplified).
3. Anisotropic colloids e.g.
    mineral particles e.g. montmorillite, talc, anisotropic crystals e.g. calcium carbonate, graphene oxide, carbon nanotubes.
    organic fibres, nanowires e.g. nanocrystalline cellulose (exemplified), collagen.

Also included is data for the thermotropic nematic medium which demonstrates what can be achieved when dynamic instability is reduced.

Dispersed Phase Requirements

The dispersed phase can be a colloid, solid, liquid or air, with a surface structure that promotes normal alignment of the director at the surface. A surface may promote normal (homeotropic) alignment without modification. Alternatively, for a solid surface, normal alignment can be achieved through grafting a steric stabiliser, typically a polymer hair that is soluble in the solvent, onto the colloid surface, for example poly-hydroxy stearyl acid (PHSA) hairs for a thermotropic solvent or PVP for an aqueous solvent. A rough porous surface structure on the colloid can also promote normal alignment of the director. Alternatively, colloid charge can be used to attract an oppositely-charged group on a nematogen to anchor the nematogen to the surface such that the director is normal to the colloid surface. Alternatively, surfactants can be used to coat (or stabilise) the colloid surface (or interface) is anchored normal to the colloid surface. A surfactant with a long-chain that is soluble in the solvent is ideal for promoting normal alignment of uniaxial nematogens. Note that, for dispersions in a chromonic or discotic liquid crystal it will be desirable to align the nematogens parallel to surface of the colloid so that the director is normal to the surface.

To promote percolation in three dimensions, ideally the dispersed colloids will have a spherical, or near spherical, shape, otherwise they will orient with the director field to minimize the creation of defects within the nematic phase. Spherical particles that promote homeotropic anchoring of the director create an entangled network of disclinations (defect lines) in three dimensions from relatively low volume fractions (5-20%). Anisotropic particles that promote homeotropic anchoring of the director will require higher volume fractions in order for disclinations to percolate. At intermediate volume fractions, anisotropic particles could be selected to promote defect percolation (and elevated viscoelasticity) in two, rather than three directions. Spherical particles promoting parallel alignment do not induce disclination networks at volume fractions less than 40%.

The dispersed colloids should have a radius at least 10 times the correlation length of the nematic phase. The radius, r, of the colloids must be such that r<K/W where K is the average Frank elastic constant of the nematic phase and W is the anchoring energy of the nematogens at the surface of the colloid. If the nematic is chiral then r<p/2 where p is the chiral pitch length.

The dispersed phase could also be a three dimensional network (e.g. polymer, aerosil or other porous material) that promotes homeotropic anchoring of the director at the surface.

In the case of rod-like nematogens, homeotropic anchoring of the director at the surface of the dispersed phase can be promoted by:
  steric stabilisers
  electrostatic interactions
  coating colloids with suitable surfactants
  bare surfaces, e.g. powders as received (exemplified with cornflour, titania, spheroglass, silica)

In the case of disc-like nematogens (including chromonic LCs and discotic nematic phases), the director lies normal normal anchoring of the director at the surface of the dispersed phase can be promoted by:
  π—interactions between the colloid surface and core of the biaxial nematogen (e.g. aromatic-aromatic 7-stacking between melamine colloids and the chromonic Sunset Yellow)
  smooth polymer coatings (e.g. poly-vinyl alcohol) around the colloid Production To produce a colloid-stabilised disclination gel, it is necessary to disperse colloids within the nematic phase. As with any dispersion, it can be difficult to disperse a powder within a solvent and this is more difficult within the nematic phase where attraction potentials of >100$k_B$T hold particles together. It is possible to disperse colloids within a nematic solvent but problems can arise with colloids prone to aggregation. Therefore, it is wise to disperse colloids in an isotropic phase using standard techniques e.g. high shear or ultrasound. The isotropic phase can be obtained by elevating the temperature or by diluting the nematic phase until it reaches the isotropic phase. On returning to the nematic phase through cooling or driving off solvent, domains of nematic phase will form within the isotropic phase and can drive colloids to the boundaries. This can lead to the formation of percolating disclination lines at volume fractions as low as 5% and is known as the cellular colloid-nematic dispersion. This state is not recoverable after the application shear. If the user prefers to make a dispersion that is recoverable after shear they should apply shear during the formation of the nematic phase so that the colloids are more homogenously dispersed throughout the composite.

Examples we have made include:
  Melamine colloids dispersed in the chromonic liquid crystal Sunset Yellow
  PMMA-PHSA colloids in a thermotropic liquid crystal, 5CB (published in Science)
  Uncharged PMMA-PVP colloids in a uniaxial micelle lyotropic nematic liquid crystal of SDS, decanol and water.
  Silica particles dispersed in a uniaxial micelle lyotropic nematic liquid crystal of SDS, decanol and water.
  Charged polystyrene colloids in a uniaxial micelle lyotropic nematic liquid crystal of SDS, decanol and water.
  Titanium dioxide particles dispersed in TEMPO modified nanocrystalline cellulose in water.
  Cornflour dispersed in TEMPO modified nanocrystalline cellulose in water.
  Calcite dispersed in TEMPO modified nanocrystalline cellulose in water
  Spheriglass particles, of 10 micron and 30-50 micron diameter, dispersed in TEMPO modified nanocrystalline cellulose in water.
  Silica dispersed in TEMPO modified nanocrystalline cellulose in glycerol.
  Silica dispersed in TEMPO modified nanocrystalline cellulose in a solvent that is ~55% ethanol in water.

Physical Characteristics of the Disclinations Arrested in Nematic gel

This is a platform technology for formulating a range of products. This gel is stiff ($10^2$-$10^6$ Pa) under low strains and exhibits glassy dynamics due to the arrest of percolating disclinations.

Despite being highly elastic, once a critical strain is exerted, it becomes highly shear thinning (viscosity almost inversely proportional to shear rate) under continuous strain. This creates a pleasant texture for spreading and coating and a stiffness that recovers within seconds.

Nematic liquid crystals contain only orientational order and defect lines will disappear upon relaxation of the fluid unless they are stabilised by surfaces. The storage modulus, G', is a measure of the solid-like response of the material and is given by G'=NT/A where T is the line tension of a disclination (usually around 100 pN) and A is the area of the substrates and N is the number of disclinations percolating between the upper and lower surfaces. For maximum packing $G'=T/\pi a^2$ where a is the average distance between disclinations which is determined by surface treatment on surrounding substrates. Typically, a nematic film with a=1 micron reaches $G'=10^3$ Pa, where G' is the storage modulus or a soft material and is the elastic contribution to the complex modulus. When disclinations are nucleated by a dispersed phase, a is limited by the a=1.1d which is the separation for entangled Saturn ring disclinations between neighbouring colloids where d is the colloid diameter.

Effectively, nematogens are anchored at the disclinations which prevents fluctuations and flow within the liquid crystal. The disclinations trap the nematic phase within a soft glassy phase that can be described by a rheological mastercurve when the values of the storage modulus and frequency axis are normalised by the number of disclinations.

Competition between the flow behaviour and elastic energy of the nematic is described by the Erickssen number $$E_r = \frac{\alpha \dot{\gamma} a^2}{K}$$

where $\dot{\gamma}$ is the shear rate exerted on the material. Flow dominates when the Ericksen is greater than 1. For small amplitude oscillatory shear, the critical frequency above which flow behaviour dominates (elastic behaviour dominating for low shear rates) rises as the average separation between disclinations decreases since $$\omega_c > \frac{2\pi K}{\mu \gamma a^2}.$$

Thus elasticity dominates to higher frequencies (or shear rates) when the number of disclinations percolating across the sample increases. When the disclinations are separated by distances <50 microns, the rheology becomes increasingly glassy and elastic.

In the case of the Dispersed Phase Disclination Gel, disclinations can only percolate if the nematic director aligns perpendicular to the colloid such that it creates a quadrupolar defect pattern; a Saturn-ring may be evident. When the colloid volume fraction >10% the disclinations join and percolate through the nematic phase thus becoming arrested and creating an elastic solid with glassy dynamics. At volume fractions approximately greater than 55% colloids the rheology becomes dominated by colloid-colloid contacts, rather than disclinations.

Another feature of the gel is that the disclinations are close to isotropic within their core and this allows for enhanced diffusion or transport through the corridors of the disclination because they have a lower viscosity than the surrounding nematic. Disclinations are also known for attracting nanoparticles or large molecules since the elastic continuum of the nematic expels additives that distort the director. These features lend the gel to applications requiring the structuring and/or transport of nanoparticles or large molecules.

Applications

Resilient Formulations

Defect lines, or Disclinations, are not real entities like polymer molecules, which can change conformation and thereby the rheological properties following high shear or extension. Defect lines form when a nematic phase is allowed to relax in the presence of surfaces that prevent uniform alignment. Presuming the colloids are not affected, disclination-mediated composites affected by pre-processing steps such as high temperature or pressure because, quite simply, disclination networks cannot not exist under these conditions and must reform when shear ceases. Therefore, disclination gels have the potential to replace polymers in the production of composites that require extreme processing conditions. Gelation due to the formation of disclinations will only occur when the nematic phase is formed by cooling or evaporation.

Application: Formulations with Good Stability and Tunable Stability

Currently, topical formulations are usually made with lamellar liquid crystalline phases or polymer solutions. A storage modulus of >100 Pa provides thick cream with luxurious feel. A storage modulus of 10 Pa is more than sufficient to prevent the creaming or sedimentation of droplets or colloids within the dispersion. On application and rubbing customers prefer a highly shear thinning cream to give lubrication feel. The disclination gel has the rheology of a soft glass and is independent of temperature while the gel is maintained in the nematic phase. Therefore, this gel offers superior stability over polymer solution gels. Due to their intrinsic positional order, lamellar phases always contain percolating defects and therefore it is not possible to control the range of storage moduli, timescales and shear dependence as is available with a nematic background. The moduli can be controlled over 4 orders of magnitude using the volume fraction of colloids.

Application: Prevention of Coalescence

In a system of percolating disclinations within an elastic nematic matrix, colloids are held at a separation of r=1.1d where r is the distance between droplet centres [7], as long as the conditions promote quadrupolar defects (Saturn-ring) around the colloids. A repulsive force prevents droplets from approaching one another. This ensures that the droplets cannot touch one another. Therefore, in such systems droplets or bubbles are held apart and cannot coalesce unless sufficient force is applied to induce coalescence. Therefore, a formulation or composite based on colloids dispersed in a nematic liquid crystal is ideal for preventing or controlling coalescence behaviour.

The long term stability of low viscosity emulsion in lyotropic calamatic nematic phases demonstrates the suitability for formulations carrying immiscible fluids, e.g. personal care products.

Application: Formulations with Highly Shear Thinning Performance

Disclination gels can be almost perfectly shear-thinning such that the viscosity is almost inversely proportional with the shear rate until the viscosity of the nematic is reached. The strain (and stress) at which the gel yields can be controlled by the volume fraction of colloids. The shear thinning behaviour lends the gel towards printing applications since nozzles are unlikely to jam. Once deposited the gel regains its storage modulus within 1 minute and therefore will not continue to flow.

Application: Cohesive, Yet Removable, Gels that Maintain Space

Since the disclination gel will not stick to smooth surfaces, the gel is particularly suitable for insertion in spaces where it is required to maintain space (through having a high storage modulus) but should not bond to a surface and should be sufficiently cohesive so that it can be removed in one go. Examples include:

Gels required to maintain space between the lens and cornea during cataract surgery. If the gel can be designed so that the cornea and lens surface do not promote disclinations within the gel, then it can be injected easily (through shear thinning at high shear) and then removed intact using a lower shear rate.

Application: Uniform Distribution of Particles Upon Drying

Disclinations can resist phase separation to create a homogenous dispersion. Disclination gels typically have a storage modulus in excess of 10 Pa. This is sufficient to prevent the migration of colloids during the drying of a suspension and subsequent compression. Therefore, disclination gels are very suitable for creating homogeneous coatings. Examples include
  paints,
  inks,
  agrochemicals, and
  topical formulations Application: Applications Requiring Good Injectability and Solidification in Use At high volume fractions (>40%) the gel has a high modulus yet is still highly shear thinning so that it can be injected through a narrow gauge needle. It recovers its original storage modulus within one minute. This composite could be used for:
  Sub-cutaneous implants for sustained drug release. The actives can be carried within an emulsion or as nano- to micro-sized colloids dispersed within a biocompatible nematic phase (e.g. collagen, lipid uniaxial micelles or bicelles)
  Bone graft material. In bone graft material colloids (e.g. blood cells, calcium phosphate, hydroxyapatite, stem cells) are mixed into a stiff composite. Use of a nematic solvent would facilitate injection and provide a suitable stiffness to keep the necessary ingredients for bone growth together. Furthermore, the composite would recover if subjected to high stress by the patient.
  Implants for joint surgery. The disclination gel provides a new method for creating implants for use in join surgery. The disclination gel provides a wide range of moduli and yields at a range of strains so could be tailored to create an implant with the correct stress and strain properties for the patient, considering weight and level of activity. Its ability to adapt to surfaces, to slip on surfaces promoting planar alignment (thus enabling lubrication) and to remain intact (through disclination networks) and to recover its modulus after yielding provide it with superior properties over current materials available to the medical profession. Example materials could include hydroxyapatite with a nematic collagen matrix.
  3D printing requires composites that can be injected easily and then solidify upon application.
  Inkjet printing requires inks that can be injected easily and then do not drip or phase separate upon application.

Application: Yarn and Film Creation

For colloidal dispersions with spherical, or near spherical, particles the disclination gel becomes highly extensible at volume fractions >40% reaching peak extensibility at ~49%. The timescale for relaxation of a yarn of film is very long (greater than 1 minute) owing to the glassy rheology of the disclinations. Yarns or films can be created by extending the disclination gel to the appropriate diameter and then fixed through drying or polymerisation (when the nematogens are monomeric) e.g. through UV polymerisation or heat. The smallest yarn or film width is a little larger than the colloid diameter, within a media that promotes homeotropic alignment of the director (such as air for a thermotropic nematic). This is a new approach to yarn or film fabrication which may diversify opportunities to create yarns from biologically compatible materials or the incorporation of small amounts of conductive materials within yarns (using disclinations—see below). Film formation is advantageous in preventing bubble or droplet coalescence in composites such as ceramics or bread doughs.

Application: Directed Diffusion or Driven Motion (Along Disclinations).

Disclinations are isotropic at their core which means that diffusion is much faster through disclinations than through the surrounding nematic phase. Since disclinations are cylindrical in shape, diffusion occurs in one dimension and can be biased to flow in one direction through a gradient, e.g. absorption or an osmotic gradient. This property can be used to enhance the delivery of useful molecules or nanoparticles across the composite, in particular for cosmetic and pharmaceutical applications Application: Template 3D Networks of Nanowires Colloids induce a 3D network of disclinations through the composite. The infusion of polymer molecules or nanoparticles through the disclination network could be used to template a 3D network of nanowires. Once solidified through a mechanism e.g. Van der Waals attractions, polymerisation or sintering, the nematic fluid can be removed through dilution or heating to the isotropic phase allowing for removal through aspiration or fluid flow.

Application: Adaptive Formulations

Electric or magnetic fields: The position of the Saturn-ring disclinations can be moved to a colloid pole by applying an external electric or magnetic field. This results in a topological dipole defect which causes colloids to assemble into colloidal strings and breaks the percolation of disclinations throughout the gel. Therefore, electric and magnetic fields can be applied to 'break' the gel when desired. This could be useful when it is desirable to cause phase separation within a dispersion, for example when creating multi-layer coatings. Alternatively, the alignment of the background nematic can also be aligned through applied electric or magnetic fields (as used in liquid crystal displays) and this mechanism could be used to reduce or increase the number of disclinations percolating between surfaces.

Chemicals in the environment: It has been shown that chemicals can change the alignment of nematogens at a colloid surface [5]. This could induce a change from normal to planar alignment at the surface of the colloids which would result in the loss of disclinations percolating through the composite and a loss of modulus. Therefore, this invention could be used to create a formulation that only has a high modulus under particular chemical conditions.

Phase change: Disclination gels only have an elevated modulus due to disclinations that form in the nematic phase. The density of disclinations increases if cooled to a liquid crystal phase carrying positional order (e.g. smectic, lamellar or chiral nematic) and disclinations disappear on heating to deep within the isotropic phase. Therefore, the modulus and tackiness of the gel could be changed using temperature, perhaps enabling removability for example for adhesives, lubricants. Similarly, absorption of solvent can lead to a nematic-isotropic transition and loss of modulus.

Example Applications:
  Destabilisation of formulations to induce phase separation and enable recovery of components for recycling and prevention for release into the environment. For example, the average household has 17 pots of decorative paint in storage [6]. A dispersion of colloids (e.g Titania and latex) in a nematic phase would remain stable in storage but could be recycled easily through dilution (or heating) to the isotropic phase and centrifuge.

Chemical sensor—adhesivity or conductivity is lost when particular chemicals are in the environment. A matrix for three dimensional growth of microorganisms.

Robot grip—modulation of material stiffness is essential for interfacing hard materials with soft materials. This is a challenge in the field of robotics. An adaptive disclination gel lends itself to this application where the stress exerted on an object is modulated by the number of disclinations promoted by the robot and mediated by the disclination gel filled with colloids.

The invention claimed is:

1. A gel comprising a colloid dispersed in a lyotropic nematic liquid crystal, the lyotropic nematic liquid crystal comprising defect lines formed by the colloid, wherein
   the lyotropic nematic liquid crystal comprises a nematogen dissolved or suspended in a liquid, the liquid comprising water, glycerol, ethanol, an organic oil or a silicone oil;
   the nematogen is selected from mineral particles and organic material; and
   the gel comprises the colloid in a volume fraction of 10-55%.

2. A gel as claimed in claim 1, having a storage modulus as measured by oscillatory rheology of $1$-$10^5$ Pa.

3. A gel as claimed in claim 1, having a flow behaviour index n of 0-40.

4. A gel as claimed in claim 1, wherein the mineral particles are selected from montmorillite, bentonite talc, calcium carbonate, graphene oxide and carbon nanotubes.

5. A gel as claimed in claim 1, wherein the organic material comprising the nematogen is selected from cellulose, nanocrystalline cellulose, collagen, chitin, actin, collagen, silk proteins and dipeptides.

6. A gel as claimed in claim 1, wherein the dispersed colloid is a solid, liquid or gas having a surface which promotes normal anchoring of nematogens.

7. A gel as claimed in claim 1, wherein the dispersed colloid material is selected from melamine particles, polymethylmethacrylate particles, inorganic oxide particles, anionic polystyrene particles, cationic polystyrene particles, cornflour particles, glass particles, silica particles, titania particles, calcite particles, hydroxyapatite particles, sunflower oil, silicone oil and air.

8. A gel as claimed in claim 6, wherein the dispersed colloid comprises either (a) polymethylmethacrylate particles with poly-12-hydroxy-stearic acid or polyvinylpyrrolidone grafted to the particle surface, or (b) silicone oil with sodium dodecyl sulphate.

9. A method for making a gel as claimed in claim 1, the method comprising the steps of:
   (a) mixing a nematogen with a liquid and the colloid to form a resulting dispersion, and
   (b) applying shear to the resulting dispersion at a temperature such that a lyotropic nematic liquid crystal phase is formed.

10. A method as claimed in claim 9, wherein the mixing in step (a) is by one of more of sonicating, vortex mixing or stirring.

11. A method as claimed in claim 9, wherein the mixing in step (a) is by the application of shear through shear mixing, flowing, spreading, extruding or injecting.

12. An adhesive, lubricant, ceramic, film, spray, gel, lotion, foam, nanowire, yarn, medical implant, wearable, bone graft material, 3D printing material, ink, agrochemical formulation, topical formulation, paint, coating, composite, energy storage material, advanced material, responsive composite, cosmetic product, personal care product, pharmaceutical or foodstuff comprising the gel of claim 1.

* * * * *